US010205499B2

(12) United States Patent
Harrison et al.

(10) Patent No.: US 10,205,499 B2
(45) Date of Patent: Feb. 12, 2019

(54) SYSTEMS AND METHODS FOR ADAPTING A CODEBOOK FOR USE WITH MULTIPLE ANTENNA CONFIGURATIONS

(71) Applicant: Telefonaktiebolaget LM Ericsson (publ), Stockholm (SE)

(72) Inventors: Robert Mark Harrison, Grapevine, TX (US); Mattias Frenne, Uppsala (SE); Shiwei Gao, Nepean (CA); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 31 days.

(21) Appl. No.: 15/183,992

(22) Filed: Jun. 16, 2016

(65) Prior Publication Data
US 2016/0373175 A1 Dec. 22, 2016

Related U.S. Application Data

(60) Provisional application No. 62/181,540, filed on Jun. 18, 2015.

(51) Int. Cl.
*H04B 7/0456* (2017.01)
*H04B 7/06* (2006.01)

(52) U.S. Cl.
CPC ......... *H04B 7/0482* (2013.01); *H04B 7/0469* (2013.01); *H04B 7/0473* (2013.01); *H04B 7/0626* (2013.01); *H04B 7/0639* (2013.01)

(58) Field of Classification Search
CPC .. H04B 7/0482; H04B 7/0469; H04B 7/0473; H04B 7/0626; H04B 7/0639
See application file for complete search history.

(56) References Cited

U.S. PATENT DOCUMENTS

| | | | | |
|---|---|---|---|---|
| 9,768,849 B2* | 9/2017 | Ko | ...................... | H04B 7/0469 |
| 9,806,781 B2* | 10/2017 | Rahman | ............... | H04B 7/0469 |
| 9,882,616 B2* | 1/2018 | Lee | ........................ | H04B 7/0469 |
| 2008/0292012 A1* | 11/2008 | Kim | ..................... | H04B 7/0452 |
| | | | | 375/260 |
| 2011/0212730 A1* | 9/2011 | Wennstrom | ........... | H04L 1/1861 |
| | | | | 455/450 |
| 2013/0163687 A1 | 6/2013 | Jing et al. | | |
| 2013/0182750 A1 | 7/2013 | Zhang et al. | | |
| 2013/0229980 A1 | 9/2013 | Wernersson et al. | | |
| 2014/0016549 A1* | 1/2014 | Novlan | ................. | H04B 7/0417 |
| | | | | 370/328 |

(Continued)

OTHER PUBLICATIONS

PCT Notification of Transmittal of the International Search Report and the Written Opinion of the International Searching Authority, or the Declaration, International Application No. PCT/IB2016/053589, 16 pages, dated Sep. 12, 2016.

*Primary Examiner* — Sophia Vlahos
(74) *Attorney, Agent, or Firm* — Baker Botts, LLP

(57) ABSTRACT

According to certain embodiments, a method by a network node for adapting a codebook for use with multiple antenna configurations is provided. The method includes configuring a wireless device to provide CSI feedback using a precoding codebook. Each one of a plurality of codebook entries within the precoding codebook corresponds to a potential position of an antenna element. The method further includes transmitting, by the network node, an indication of a subset of codebook entries to be combined when calculating CSI feedback by the wireless device.

24 Claims, 20 Drawing Sheets

(56) References Cited

U.S. PATENT DOCUMENTS

| | | | |
|---|---|---|---|
| 2014/0098793 A1* | 4/2014 | Hunukumbure | H04L 5/0023 370/332 |
| 2014/0205038 A1* | 7/2014 | Nakamura | H04L 25/0391 375/267 |
| 2016/0080052 A1* | 3/2016 | Li | H04B 7/0456 375/267 |
| 2016/0337864 A1* | 11/2016 | Song | H01Q 1/246 |

* cited by examiner

SYSTEMS AND METHODS FOR ADAPTING A CODEBOOK FOR USE WITH MULTIPLE ANTENNA CONFIGURATIONS

PRIORITY

This application claims priority to U.S. Patent Provisional Application No. 62/181,540 filed on Jun. 18, 2015, entitled "Fast Codebook Search of Flexible 2D Antenna Arrays," the disclosure of which is hereby incorporated by reference.

TECHNICAL FIELD

The present disclosure relates, in general, to wireless communications and, more particularly, systems and methods for adapting a codebook for use with multiple antenna configurations.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. Currently LTE-Advanced supports an 8-layer spatial multiplexing mode for eight transmit antennas with channel dependent precoding. The spatial multiplexing mode is aimed for high data rates in favorable channel conditions.

FIG. 1 illustrates a spatial multiplexing operation. As seen, the information carrying symbol vector, s, is multiplied by an $N_T \times r$ precoder matrix, W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink (and DFT precoded OFDM in the uplink) and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the wireless device. In addition, the precoder matrix may also be selected to strive for orthogonalizing the channel, meaning that after proper linear equalization at the wireless device, the inter-layer interference is reduced.

One example method for a wireless device to select a precoder matrix W can be to select the $W_k$ that maximizes the Frobenius norm of the hypothesized equivalent channel:

$$\max_k \left\| \hat{H}_n W_k \right\|_F^2$$

where,
$\hat{H}_n$ is a channel estimate, possibly derived from CSI-RS as described below.
$W_k$ is a hypothesized precoder matrix with index k.
$\hat{H}_n W_k$ is the hypothesized equivalent channel In closed-loop precoding for the LTE downlink, the wireless device transmits, based on channel measurements in the forward link (downlink), recommendations to the eNodeB of a suitable precoder to use. The network node, such as an eNB, configures the wireless device to provide feedback according to the wireless device's transmission mode, and may transmit CSI-RS and configure the wireless device to use measurements of CSI-RS to feedback recommended precoding matrices that the wireless device selects from a codebook. A single precoder that is supposed to cover a large bandwidth (wideband precoding) may be fed back. It may also be beneficial to match the frequency variations of the channel and instead feedback a frequency-selective precoding report, e.g. several precoders, one per sub-band. This is an example of the more general case of channel state information (CSI) feedback, which also encompasses feeding back other information than recommended precoders to assist the eNodeB in subsequent transmissions to the wireless device. Such other information may include channel quality indicators (CQIs) as well as transmission rank indicator (RI).

Given the CSI feedback from the wireless device, the eNB determines the transmission parameters it wishes to use to transmit to the wireless device, including the precoding matrix, transmission rank, and modulation and coding state (MCS). These transmission parameters may differ from the recommendations the wireless device makes. Therefore a rank indicator and MCS may be signaled in downlink control information (DCI), and the precoding matrix can be signaled in DCI or the eNB can transmit a demodulation reference signal from which the equivalent channel can be measured. The transmission rank, and thus the number of spatially multiplexed layers, is reflected in the number of columns of the precoder W. For efficient performance, it is important that a transmission rank that matches the channel properties is selected.

In LTE Release-10, a new reference symbol sequence was introduced for the intent to estimate downlink channel state information, the CSI-RS. The CSI-RS provides several advantages over basing the CSI feedback on the common reference symbols (CRS) which were used, for that purpose, in previous releases. Firstly, the CSI-RS is not used for demodulation of the data signal and, thus, does not require the same density (i.e., the overhead of the CSI-RS is substantially less). Secondly, CSI-RS provides a much more flexible means to configure CSI feedback measurements (e.g., which CSI-RS resource to measure on can be configured in a wireless device-specific manner).

By measuring a CSI-RS transmitted from the network node, a wireless device can estimate the effective channel the CSI-RS is traversing including the radio propagation channel and antenna gains. In more mathematical rigor this implies that if a known CSI-RS signal x is transmitted, a wireless device can estimate the coupling between the transmitted signal and the received signal (i.e., the effective channel). As such, if no virtualization is performed in the transmission, the received signal y can be expressed as follows:

$$y = Hx + e$$

The wireless device can estimate the effective channel, H.

Up to eight CSI-RS ports can be configured in LTE Rel-10. Thus, the wireless device can estimate the channel from up to eight transmit antennas.

Related to CSI-RS is the concept of zero-power CSI-RS resources (also known as a muted CSI-RS) that are configured just as regular CSI-RS resources, so that a wireless device knows that the data transmission is mapped around those resources. The intent of the zero-power CSI-RS resources is to enable the network to mute the transmission on the corresponding resources in order to boost the SINR of a corresponding non-zero power CSI-RS, possibly transmitted in a neighbor cell/transmission point. For Rel-11 of LTE, a special zero-power CSI-RS was introduced that a wireless device is mandated to use for measuring interference plus noise. A wireless device can assume that the TPs of interest are not transmitting on the zero-power CSI-RS resource, and the received power can therefore be used as a measure of the interference plus noise.

Based on a specified CSI-RS resource and on an interference measurement configuration (e.g. a zero-power CSI-RS resource), the wireless device can estimate the effective channel and noise plus interference, and consequently also determine the rank, precoding matrix, and MCS to recommend to best match the particular channel.

This disclosure may be used with two dimensional antenna arrays and some of the presented embodiments use such antennas. Such antenna arrays may be (partly) described by the number of antenna columns corresponding to the horizontal dimension, $M_h$, the number of antenna rows corresponding to the vertical dimension, $M_v$, and the number of dimensions corresponding to different polarizations, $M_p$. The total number of antennas is thus calculated by:

$$M = M_h M_v M_p$$

It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

FIG. 2 illustrates an example of a 4×4 array with cross-polarized antenna elements. Precoding may be interpreted as multiplying the signal with different beamforming weights for each antenna prior to transmission. A typical approach is to tailor the precoder to the antenna form factor by taking into account $M_h$, $M_v$, and $M_p$ when designing the precoder codebook.

A common approach when designing precoder codebooks tailored for two-dimensional antenna arrays is to combine precoders tailored for a horizontal array and a vertical array respectively by means of a Kronecker product. This means that (at least part of) the precoder can be described as a function of:

$$W_H \otimes W_V$$

where $W_H$ is a horizontal precoder taken from a (sub)-codebook $X_H$ containing $C_H$ codewords and similarly $W_V$ is a vertical precoder taken from a (sub)-codebook $X_V$ containing $C_V$ codewords. The joint codebook denoted as $X_H \otimes X_V$ contains $C_H \cdot C_V$ codewords. The elements of $X_H$ are indexed with $k_H = 0, \ldots, C_H - 1$, the elements of $X_V$ are indexed with $k_V = 0, \ldots, C_V - 1$ and the elements of the joint codebook $X_H \otimes X_V$ are indexed with $k_{HV} = C_V \cdot k_H + k_V$ meaning that $k_{HV} = 0, \ldots, C_H \cdot C_V - 1$.

It should be pointed out that a precoder codebook may be defined in several ways. For example, the above-mentioned Kronecker codebook may be interpreted as one codebook indexed with a single PMI, $k_{HV}$. Alternatively, it may be interpreted as a single codebook indexed with two PMIs, $k_H$ and $k_V$. It may also be interpreted as two separate codebooks, indexed with $k_H$ and $k_V$, respectively. Further, the Kronecker codebook discussed above may only describe a part of the precoder. Thus, the precoder may be a function of other parameters as well. For example, the precoder may also be a function of another PMI, n. Again, this can be interpreted as three separate codebooks with indices $k_H$ and $k_V$ and n, respectively, or two separate codebooks with indices $k_{HV} = N_V \cdot k_H + k_V$ and n, respectively. It may also be interpreted as a single joint codebook with a joint PMI. However, these are only examples as to how a codebook may be defined. Any suitable method may be used for defining the codebook.

One example of the codebook structure with three PMIs is when the precoder W has the following form:

$$W = \begin{pmatrix} W_H \otimes W_V & 0 \\ 0 & W_H \otimes W_V \end{pmatrix} W_n$$

DFT-based precoder codebooks for $W_H$, $W_V$ are commonly used. When interpreted as a single codebook indexed with two PMIs as described above, the codebook can be expressed as a matrix X:

$$X(k_H, k_V) = e^{j2\pi \frac{l(k_H + \Delta)}{Q_H N_H}} e^{j2\pi \frac{m(k_V + \Delta)}{Q_V N_V}}$$

Where:
$X(k_H, k_V)$ is a matrix of $N_V$ rows and $N_H$ columns associated with a precoder (or 'beam') indexed by $k_H$ and $k_V$.

$N_V$ and $N_H$ represent the number of antenna ports in the vertical and horizontal dimensions.

All elements of $X(k_H, k_V)$ can be mapped to a column of the precoding matrix W, described above.

l, m are horizontal and vertical antenna port indices, respectively.

$Q_H$ and $Q_V$ are horizontal and vertical oversampling factors, respectively.

$k_H = 0, \ldots, N_H Q_H - 1$, $k_V = 0, \ldots, N_V Q_V - 1$ are horizontal and vertical beam indices.

$\Delta$ can take on value in the interval 0 to 1 so as to "shift" the beam pattern. (As just one example, $\Delta = 0.5$ may be a value for creating symmetry of beams with respect to the broadside of an array.)

SUMMARY

To address the foregoing problems with existing solutions, disclosed is systems and methods for adapting a codebook for use with multiple antenna configurations.

According to certain embodiments, a method by a network node for adapting a codebook for use with multiple antenna configurations is provided. The method includes configuring a wireless device to provide CSI feedback using a precoding codebook. Each one of a plurality of codebook entries within the precoding codebook corresponds to a potential position of an antenna element. The method further includes transmitting, by the network node, an indication of a subset of codebook entries to be combined when calculating CSI feedback by the wireless device.

According to certain embodiments, a network node is provided. The network node includes a memory storing instructions for adapting a codebook for use with multiple antenna configurations and a processor. The processor is operable to execute the instructions to cause the processor to configure a wireless device to provide CSI feedback using a precoding codebook. Each one of a plurality of codebook entries within the precoding codebook corresponds to a potential position of an antenna element. The method further includes transmitting an indication of a subset of codebook entries to be combined when calculating CSI feedback by the wireless device.

According to certain embodiments, a method by a wireless device is provided for adapting a codebook for use with multiple antenna configurations. The method includes determining, by a wireless device, a precoding codebook in providing CSI feedback. Each one of a plurality of codebook entries within the precoding codebook corresponds to a potential position of an antenna element. An indication of a subset of codebook entries to be combined when calculating CSI feedback by the wireless device is received from a network node. The CSI feedback is calculated based on the subset of codebook entries provided in the indication from the network node.

According to certain embodiments, a wireless device is provided that includes a memory storing instructions for adapting a codebook for use with multiple antenna configurations. The wireless device further includes a processor operable to execute the instructions to cause the processor to use a precoding codebook in providing CSI feedback. Each one of a plurality of codebook entries within the precoding codebook corresponds to a potential position of an antenna element. An indication of a subset of codebook entries to be combined when calculating CSI feedback by the wireless device is received from the network node. The CSI feedback is calculated based on the subset of codebook entries provided in the indication from the network node.

According to certain embodiments, a method by a wireless device is provided for adapting a codebook for use with multiple antenna configurations. The method includes determining, by the wireless device, a precoding codebook in providing CSI feedback. Each one of a plurality of codebook entries within the precoding codebook corresponds to one of a plurality of precoder beams and to a potential position of an antenna element. The one of the plurality of precoder beams corresponds to a beam direction. From a network node, the wireless device receives an indication of a subset of the plurality of precoder beams and an indication of a subset of codebook entries to be combined when calculating CSI feedback by the wireless device. The subset of precoder beams includes at least one restricted precoder beam to be restricted from a calculation of CSI feedback by the wireless device. The subset of codebook entries corresponds to potential positions of antenna elements. The wireless device calculates the CSI feedback based on an adaptation of the codebook. The adaptation of the codebook restricts the codebook entries associated with the at least one restricted precoder beam and restricts the codebook entries to include the subset of codebook entries to be combined.

Certain embodiments of the present disclosure may provide one or more technical advantages. For example, certain embodiments may enable the use of conventionally-sized Fast Fourier Transform (FFT) arrays of a power of two for any size rectangular arrays. Certain embodiments may also enable the user of conventionally-sized FFT arrays for use with non-rectangular arrays whose elements are constrained to fall on a grid. Another advantage may be that the computational complexity for two-dimensional codebook search may be reduced. Since realistic antenna arrays tend not to have numbers of horizontal or vertical elements that are integer powers of two, existing codebook configurations may be adapted to support antennas used in real deployments. Still another advantage may allow the use of a single codebook for a wide variety of realistic antenna array configurations. As a result, CSI feedback implementations used by a wireless device may be simplified.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments of the present disclosure may provide solutions enabling adaptation of a codebook for use with multiple antenna configurations by a network node and wireless device.

Certain embodiments allow a fast search of PMI vectors by using a power of two Fast Fourier Transform (FFT) to search a Discrete Fourier Transform (DFT) based codebook corresponding to an antenna array that has dimensions whose lengths are not powers of two, as well as arrays with antenna element positions arbitrarily placed on a grid. The methods and systems may allow a single FFT structure to be used for codebook search, minimizing search complexity while maximizing the array geometries that can be supported by the codebook. Certain methods and systems indicate occupied antenna element positions as well as map reference signal antenna ports to the antenna element positions. Certain methods and systems map occupied element positions to corners of the grid, allowing further reductions in computational complexity. Codebook subset restriction and virtualization mechanisms may also be provided to compensate for shifts in antenna pattern nulls or sidelobes that occur as the array size varies. Particular embodiments are described in FIGS. 1-20 of the drawings, like numerals being used for like and corresponding parts of the various drawings.

Figure 1:
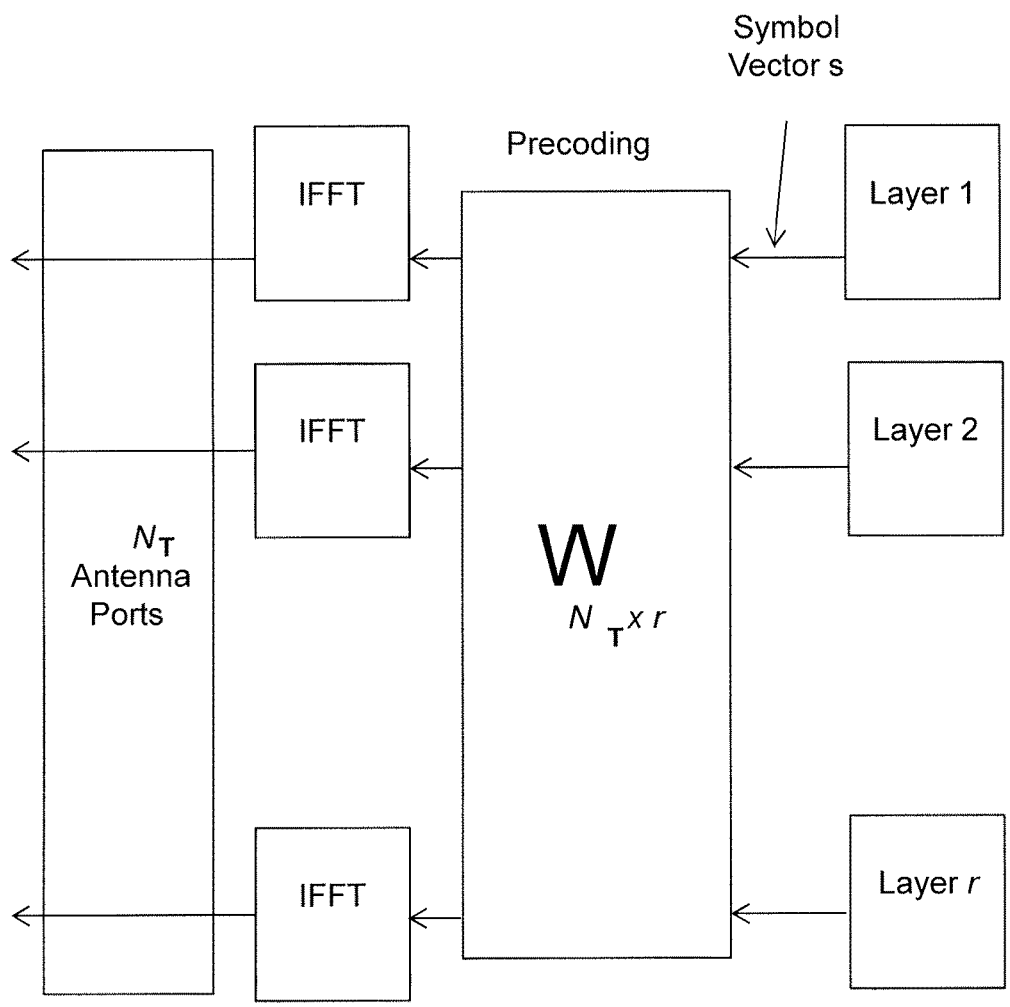
FIG. 1 illustrates a spatial multiplexing operation.
Figure 2:
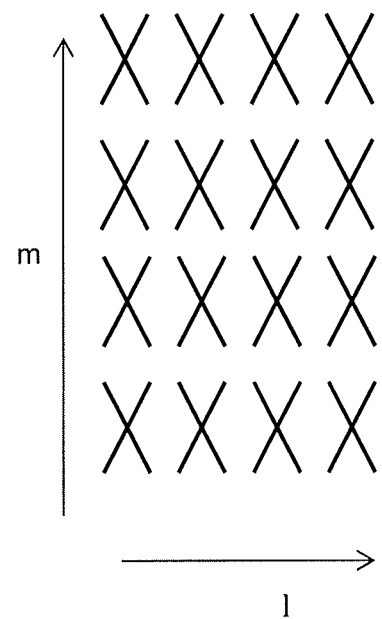
FIG. 2 illustrates an example of a 4×4 array with cross-polarized antenna elements.
Figure 3:
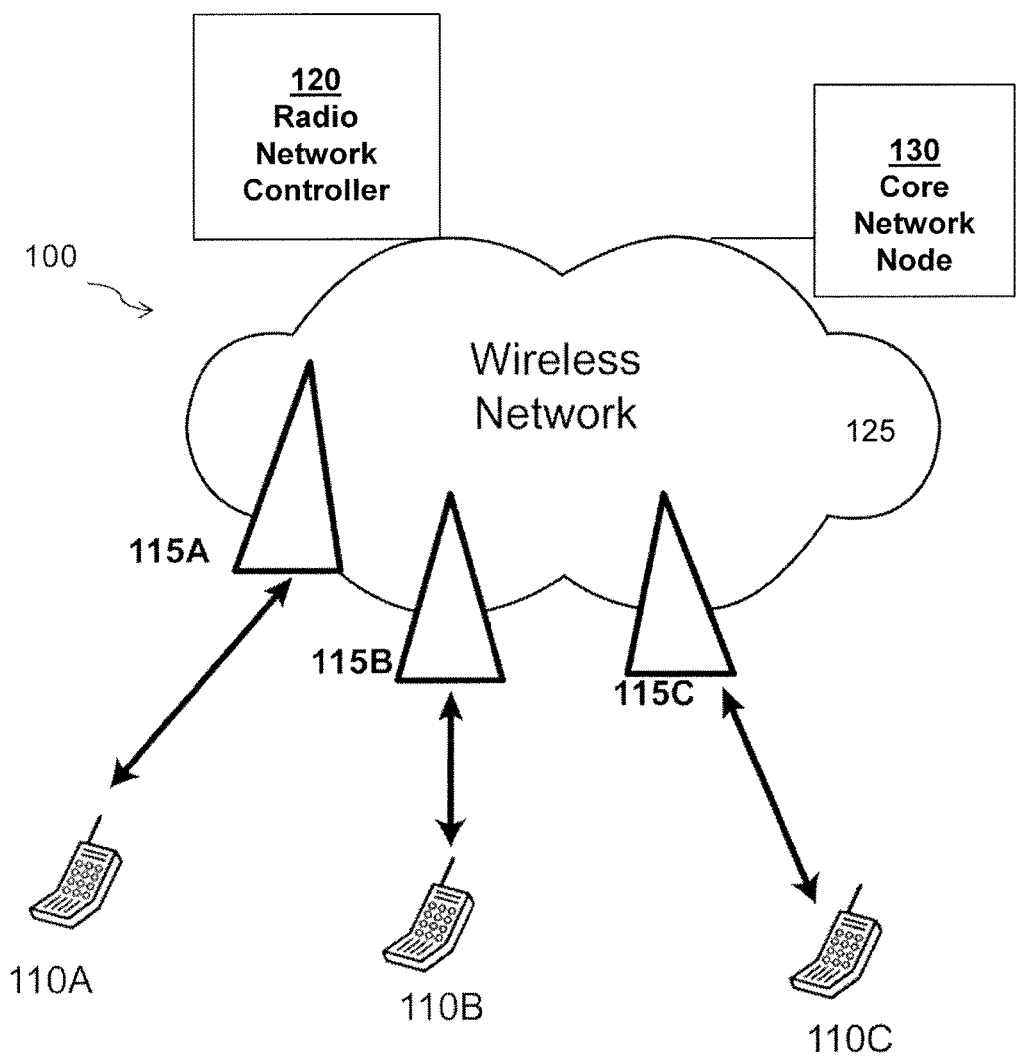
FIG. 3 illustrates an exemplary network for adapting a codebook for use with multiple antenna configurations, according to certain embodiments.

FIG. 3 is a block diagram illustrating an embodiment of a network 100 for adapting a codebook for use with multiple antenna configurations, according to certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115, radio network controller 120, and a core network node 130. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have device to device (D2D) capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller 120. Radio network controller 120 may control network nodes 115 and may provide certain radio resource management functions, mobility management functions, and/or other suitable functions. In certain embodiments, radio network controller 120 may interface with core network node 130 via an interconnecting network 125. The interconnecting network 125 may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Core network node 130 may manage the establishment of communication sessions and provide various other functionality for wireless communication device 110. Wireless communication device 110 exchanges certain signals with core network node 130 using the non-access stratum layer. In non-access stratum (NAS) signaling, signals between wireless communication device 110 and core network node 130 pass transparently through network nodes 120.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Each of wireless communication device 110, network node 115, radio network controller 120, and core network node 130 include any suitable combination of hardware and/or software. Example embodiments of network nodes 115, wireless devices 110, and other network nodes (such as radio network controller or core network node) are described in more detail with respect to FIGS. 4, 5, and 20, respectively.

Although FIG. 3 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). In certain embodiments, wireless communication device 110, network node 120, and core network node 130 use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies. However, the scope of the disclosure is not limited to the examples and other embodiments could use different radio access technologies.

Figure 4:
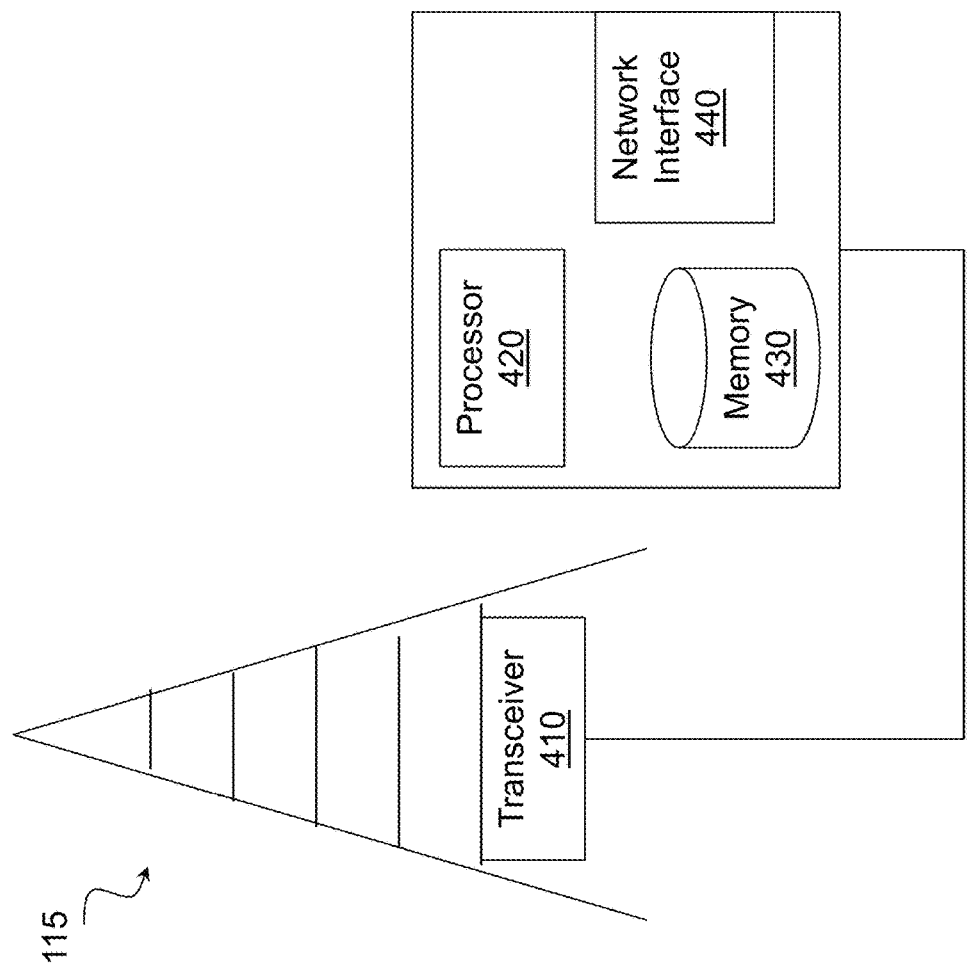
FIG. 4 illustrate an example network node for adapting a codebook for use with multiple antenna configurations, according to certain embodiments.

FIG. 4 illustrate an example network node 115 for adapting a codebook for use with multiple antenna configurations, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 410, processor 420, memory 430, and network interface 440. In some embodiments, transceiver 410 facilitates transmitting wireless signals to and receiving wireless signals from wireless device 110 (e.g., via an antenna), processor 420 executes instructions to provide some or all of the functionality described above as being provided by a network node 115, memory 430 stores the instructions executed by processor 420, and network interface 440 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 420 may include any suitable combination of hardware and software implemented in one or more modules to execute instructions and manipulate data to perform some or all of the described functions of network node 115. In some embodiments, processor 420 may include, for example, one or more computers, one or more central processing units (CPUs), one or more microprocessors, one or more applications, and/or other logic.

Memory 430 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 440 is communicatively coupled to processor 420 and may refer to any suitable device operable to receive input for network node 115, send output from network node 115, perform suitable processing of the input or output or both, communicate to other devices, or any combination of the preceding. Network interface 440 may include appropriate hardware (e.g., port, modem, network interface card, etc.) and software, including protocol conversion and data processing capabilities, to communicate through a network.

Other embodiments of network node 115 may include additional components beyond those shown in FIG. 4 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 5:
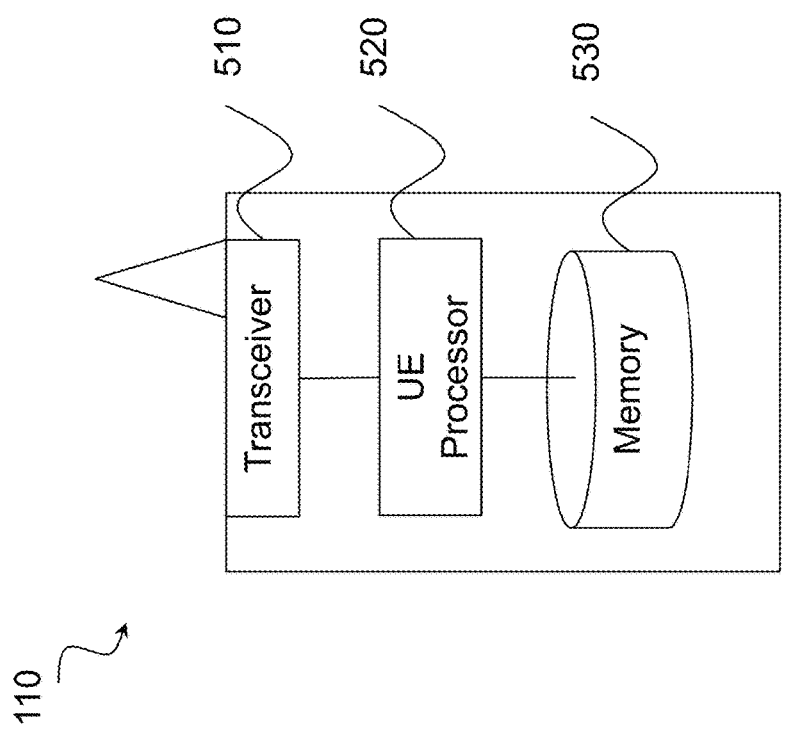
FIG. 5 illustrates an example wireless device for adapting a codebook for use with multiple antenna configurations, according to certain embodiments.

FIG. 5 illustrates an example wireless device 110 for adapting a codebook for use with multiple antenna configurations, in accordance with certain embodiments. As depicted, wireless device 110 includes transceiver 510, processor 520, and memory 530. In some embodiments, transceiver 510 facilitates transmitting wireless signals to and receiving wireless signals from network node 115 (e.g., via an antenna), processor 520 executes instructions to provide some or all of the functionality described above as being provided by wireless device 110, and memory 530 stores the instructions executed by processor 520. Examples of a network node 115 are provided above.

Processor 520 may include any suitable combination of hardware and software implemented in one or more modules to execute instructions and manipulate data to perform some or all of the described functions of wireless device 110. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 5 that may be responsible for providing certain aspects of the wireless device's functionality, including any of the functionality described above and/or any additional functionality (including any functionality necessary to support the solution described above).

In operation, network nodes 115 may configure wireless devices 110 to provide channel state information (CSI) feedback by using a codebook. However, existing CSI feedback mechanisms are also not well suited to variably sized antenna arrays. Such mechanisms generally identify each reference signal with an antenna port and associate each antenna port with precoding codebook entries in a fixed way. If the size of the array varies, a different number of reference signals and antenna ports may be needed, which can be precluded by fixed antenna port to codebook mappings.

In general, it is difficult to find simple and efficient codebook search algorithms for flexibly sized rectangular two-dimensional antenna arrays using a Discrete Fourier Transform (DFT) based two-dimensional codebooks. If Fast Fourier Transforms (FFTs) are to be used to search a codebook, it is desirable to have the codebook be of a size that is an exponent of one integer, such as a power of two. However, if the size of the array can be other than a power of two more complex FFTs are needed. In some instances, multiple FFT algorithms may be needed.

Figure 6:
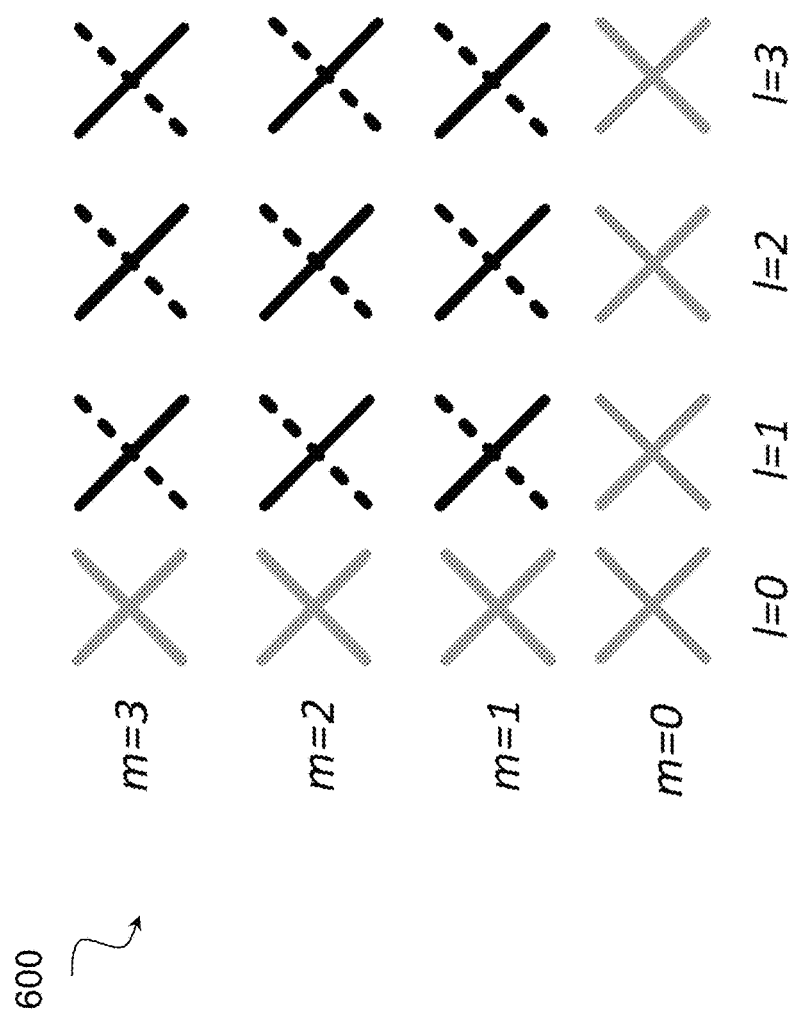
FIG. 6 illustrates an example of a 4×4 array where one row and one column of antenna elements are not occupied, according to certain embodiments.

Additionally, conventional DFT-based precoder formulation addresses the case where all elements are used, such as where $l=0, \ldots, N_h-1$, and $m=0, \ldots, N_v-1$. However, in certain embodiments, only part of the array may be used. For example, a rectangular grid of antenna element positions may be defined that are occupied or not occupied by actual antenna elements. The vertical and horizontal spacing of the grid may be different, but a fixed spacing may be used along each direction. The grid may be viewed as including uniform linear arrays (ULAs) in the horizontal and vertical directions. FIG. 6 illustrates an example of a 4×4 array 600 where one row and one column of antenna elements are not occupied, according to certain embodiments. Methods and systems described below provide for the use of conventional, DFT based two-dimensional codebooks for flexibly sized rectangular two-dimensional antenna arrays.

Figure 7:
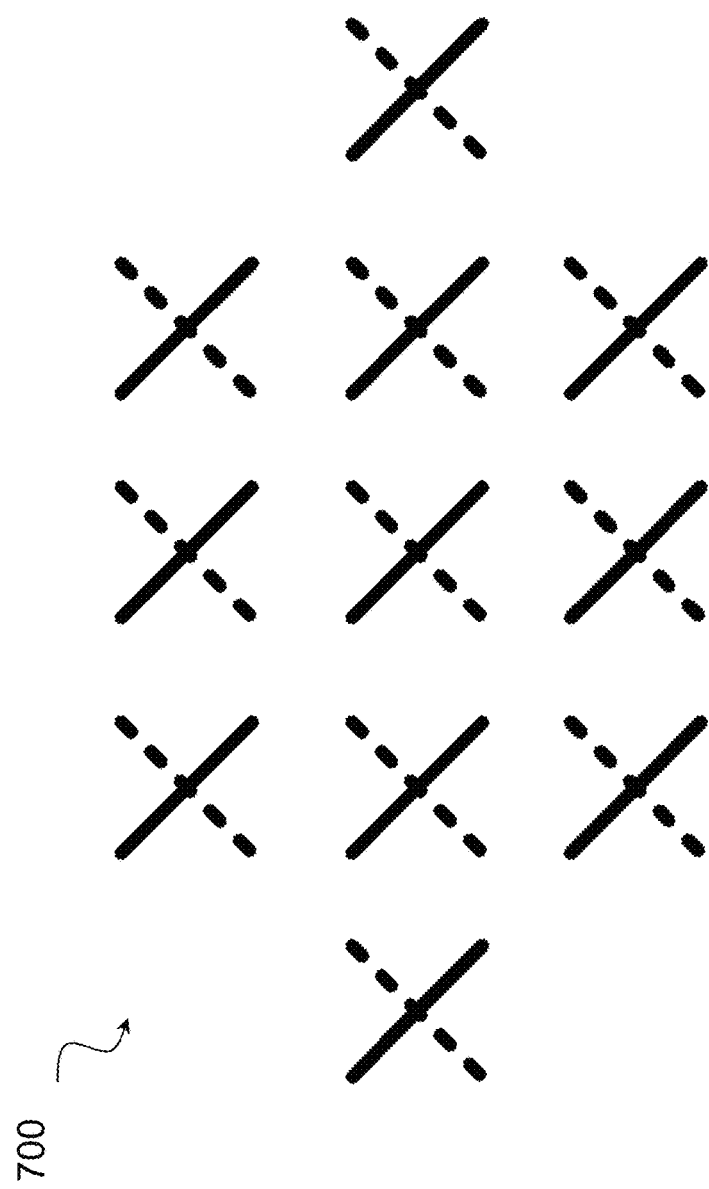
FIG. 7 illustrates an example non-rectangular antenna array, according to certain embodiments.
Figure 8:
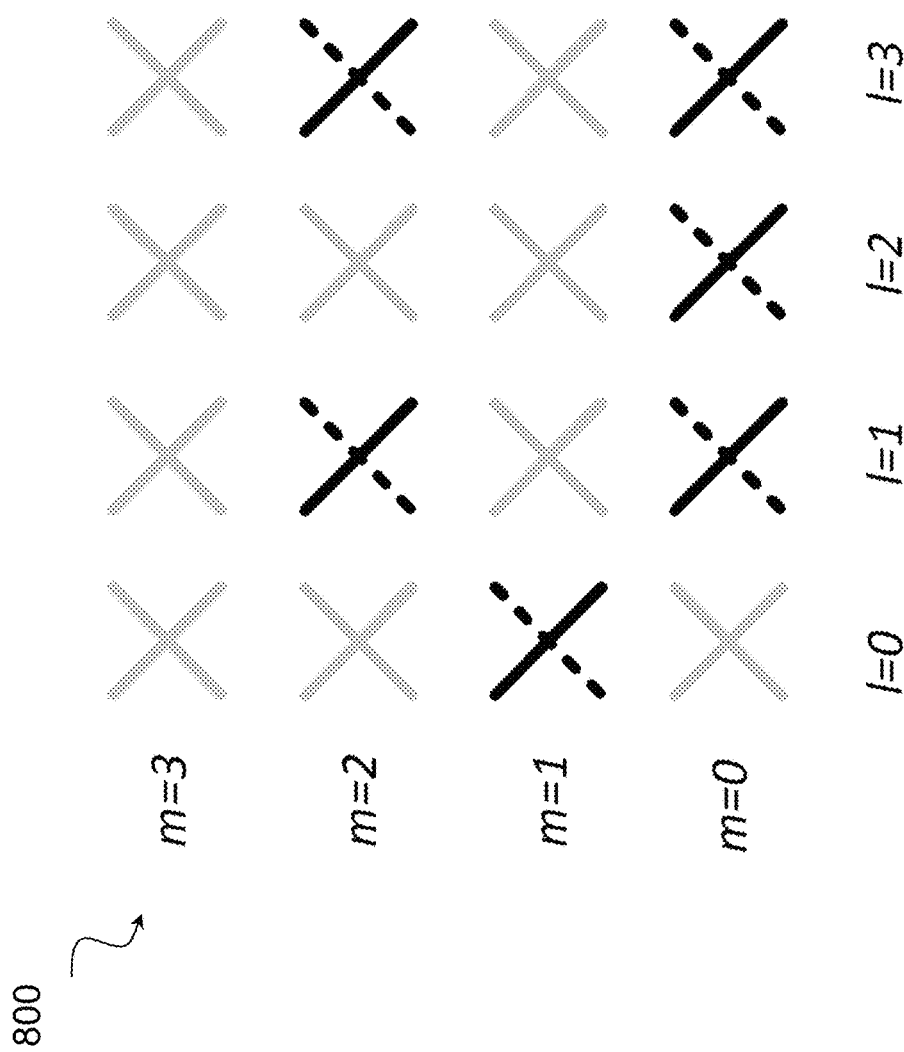
FIG. 8 illustrates an example of an asymmetric, non-contiguous antenna array, according to certain embodiments.

The methods and systems described below support more general arrays as well, where elements can be anywhere on the grid, including non-rectangular and non-contiguous and asymmetric arrays. FIG. 7 illustrates an example non-rectangular antenna array 700, according to certain embodiments. FIG. 8 illustrates an example of an asymmetric, non-contiguous antenna array 800, according to certain embodiments. In these and the following figures, the +45° and −45° polarizations are shown with black dashed and solid lines, respectively. Gray positions are not occupied. The axes defining the antenna element positions (l, m) are shown.

Non-rectangular two-dimensional antenna arrays with arbitrarily placed antenna elements, such as the elliptical antennas depicted, could be searched using codebooks matched to the array manifold of the elements. However, such a codebook is generally unstructured due to the arbitrary placement of the antenna elements. This may make the fast search algorithms used for rectangular two-dimensional antenna arrays infeasible. However, systems and methods provided herein enable the use of conventional rectangular two-dimensional array-based codebook designs for non-rectangular two-dimensional antenna arrays.

In certain embodiments, the codebook for the case when some antenna elements are unoccupied may be constructed by determining a codebook for a larger antenna array and by inserting zeroes into codebook entries that correspond to the unoccupied antenna locations. A precoder may be defined according to the modified precoder equation that follows:

$$X(k_H, k_V) = \begin{cases} e^{j2\pi \frac{l(k_H+\Delta)}{N_0}} e^{j2\pi \frac{m(k_V+\Delta)}{N_1}}; & (l, m) \in \mathcal{L} \\ 0; & \text{Otherwise} \end{cases}$$

where:
  $\mathcal{L}$ is a list of indices of occupied antenna element locations;
  each antenna element location is indexed with horizontal and vertical element position indices l and m, respectively;
  $k_H$, $k_V$ are horizontal and vertical beam indices that select a codebook entry;
  $N_0$ and $N_1$ are composite integers, preferably powers of 2; and
  all elements of X ($k_H$, $k_V$) are mapped to a column of the precoding matrix W, defined above.

It is important to note that while the codebook supports two-dimensional planar antenna arrays with elements occupying points on a grid with uniform vertical and horizontal spacing it is possible that the codebook can be applied to other antenna array geometries. Therefore, the terms 'antenna element location' and 'element position' as used herein refer to an index or indices (such as indices l and m above) of a codebook entry that may correspond to an antenna element position of a two-dimensional antenna array. If the position is occupied, the entry is generally scaled by a channel estimate and coherently combined with other codebook entries and channel estimates to form CSI feedback, where the CSI feedback calculations may, in certain embodiments, be based on the model for calculating $y_n$ described above or the precoder matrix selection method that maximizes the Frobenius norm of the hypothesized equivalent channel as described above.

In certain embodiments, one difference from the conventional codebooks described above may be that $N_0$ and $N_1$ are used instead of $Q_H N_H$ and $Q_V N_V$ in the dominators of the exponents. $N_0$ and $N_1$, in certain embodiments, can be used with a wide variety of numbers of horizontal and vertical elements $N_H$ and $N_V$ and/or with the number of occupied antenna element locations in $\mathcal{L}$. This is what may make the codebook to be considered a 'flexible' codebook. Furthermore, since $N_0$ and $N_1$ are composite integers, preferably powers of 2, simple and well known FFT algorithms can be used to search the codebook, and find the preferred precoder from the codebook, even though the number of antenna elements may be non-composite integers. The preferred precoder is usually found by evaluating a metric for each precoder in the codebook, such as the squared Frobenius norm of the hypothesized equivalent channel described above, the expected throughput, or another suitable metric.

When precoders of the form of the modified precoder equation have $N_0$ and $N_1$ as a power of two (such as for example, $N_0 = 2^c$ and $N_1 = 2^d$ with c and d being integers), radix 2 two-dimensional FFTs can be used to calculate the precoder output for each of the horizontal and vertical beam indices. For example, when a rank 1 precoder is applied to the estimated channel h(l, m) to each element of a two-dimensional antenna array with Δ=0, the result for each of the horizontal and vertical beam indices $G(k_H, k_V)$ can be expressed as follows:

$$G(k_H, k_V) = \sum_{m=0}^{N_1-1} \sum_{l=0}^{N_0-1} e^{j2\pi \frac{lk_H}{N_0}} e^{j2\pi \frac{mk_V}{N_1}} h(l, m)$$

Since oversampling is used (i.e., $N_0 > N_H$ and $N_1 > N_V$), there are more points in the DFT than there are antenna elements. As such, h(l, m) is only defined for $l < N_H$ and $m < N_V$. Therefore, in the equation immediately provided above h(l, m)=0 if $l \geq N_H$ or $m \geq N_V$.

In general, $N_0$ and $N_1$ are set to provide a suitable amount of oversampling, and so $N_0 \geq Q_H N_H$ and $N_1 \geq Q_V N_V$. As the number of antenna element positions along one or both of the dimensions decreases, for a fixed $N_0$ or $N_1$, the oversampling effectively increases. Since the performance benefit of oversampling tends to saturate at some value of $Q_H$ and/or $Q_V$, using a single value of $N_0$ or $N_1$ for both when the numbers of occupied antenna element positions is large and small may waste computational effort in wireless device 110 unless further refinements to the method are used.

Therefore, in certain embodiments when a small number of antenna positions are occupied, it may be possible to further simplify the FFTs. For example, if all occupied horizontal antenna elements are in the left half of the array, such as where $l < N_0/2 \forall (l, m) \in £$) and a fixed value of $Q_H$ is desired, then a half size FFT may be used along the horizontal dimension to compute every other precoding matrix element. Such a half size FFT may include:

$$G(2k_H, k_V) = \sum_{m=0}^{N_1-1} \sum_{l=0}^{N_0/2-1} e^{j2\pi \frac{lk_H}{N_0/2}} e^{j2\pi \frac{mk_V}{N_1}} h(l, m)$$

where h(l, m)=0 if $l \geq N_0/2$ or $m \geq N_V$. Note that the same simplification may be possible for the vertical dimension, and that it may be used simultaneously with the simplification in the horizontal dimension.

Therefore, in an embodiment, when $O < N/2^c$, the maximum number of codebook entries used by wireless device 110 to calculate and report CSI is $N/2^c$, where O is the number of occupied antenna elements along a dimension, N is a maximum number of codebook entries used by wireless device 110 to calculate CSI when all elements are occupied, and c is a positive integer.

According to particular embodiments, when the number of occupied antenna elements can vary and a single codebook is used, wireless device 110 may be expected to determine CSI reports using the entire codebook when the number of occupied antenna elements is above a threshold. Conversely, wireless device 110 may be expected to determine CSI reports using a subset of the entire codebook when the number of occupied antenna elements is less than a threshold.

According to particular embodiments, the list £ of indices of occupied antenna element locations may be signaled from network node 115 to wireless device 110 using higher layer signaling, such as RRC or MAC control elements. In one approach, the list £ is represented as pairs of integers (i, j), with each pair corresponding to an (l, m) and $0 \leq i < N_0$ and $0 \leq j < N_1$. For example, the array pictured in FIG. 8 may be signaled with £ using the following form £={(1, 0), (2, 0), (3, 0), (0, 1), (1, 2), (3, 2)}.

In another embodiment, the list of occupied antenna elements £ is represented using a bitmapped matrix, L, where each element of L corresponds to an antenna element position and is a '1' if the position is occupied by an antenna element or a '0' if the position is unoccupied. The rows and columns of L may correspond to the rows and columns of a two-dimensional antenna array, respectively. The two-dimensional antenna array should be the largest supported two-dimensional antenna array, such that both the number of rows and the number of columns of the two-dimensional antenna array are each the maximum needed for arrays supported by the specification. For example, the array 800 pictured in FIG. 8 with a maximum number of rows, $M_{max}$, equal to four and a maximum number of columns, $L_{max}$, equal to four can be signaled with the $M_{max} \times L_{max}$ matrix, L, using the following form:

$$L = \begin{bmatrix} 0 & 0 & 0 & 0 \\ 0 & 1 & 0 & 1 \\ 1 & 0 & 0 & 0 \\ 0 & 1 & 1 & 1 \end{bmatrix}$$

L may further be represented as a list or string of bits corresponding to each of the potential positions.

Figure 9:
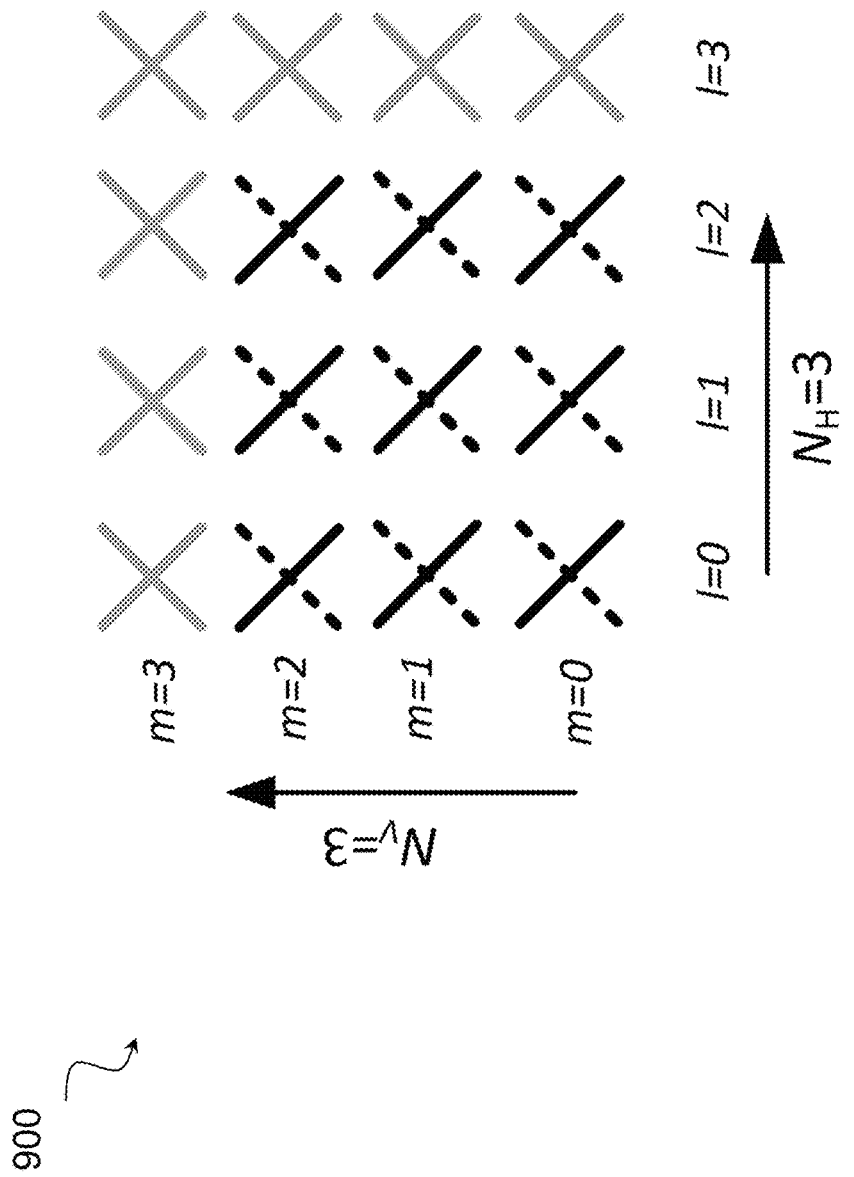
FIG. 9 illustrates an example of a relative position signaling for occupied elements of a rectangular array, according to certain embodiments.

In certain embodiments, such as when only rectangular arrays are supported, a number of antenna ports along one or more dimensions may be sufficient to identify the occupied element positions. Such embodiments operate on the principal that only the relative gain and/or phase between elements is needed in order to maximize the received power at wireless device 110. FIG. 9 illustrates an example of a relative position signaling for occupied elements of a rectangular array 900, according to certain embodiments. Specifically, the relative occupied antenna positions of the array 600 pictured in FIG. 6 may be signaled with the number of horizontal and vertical antenna ports $N_H$=3 and $N_V$=3. One position may be taken as the reference point. In the depicted embodiment, for example, the bottom left position may be taken as the reference, and consecutive positions of length $N_H$ and $N_V$ element positions are occupied.

Figure 10:
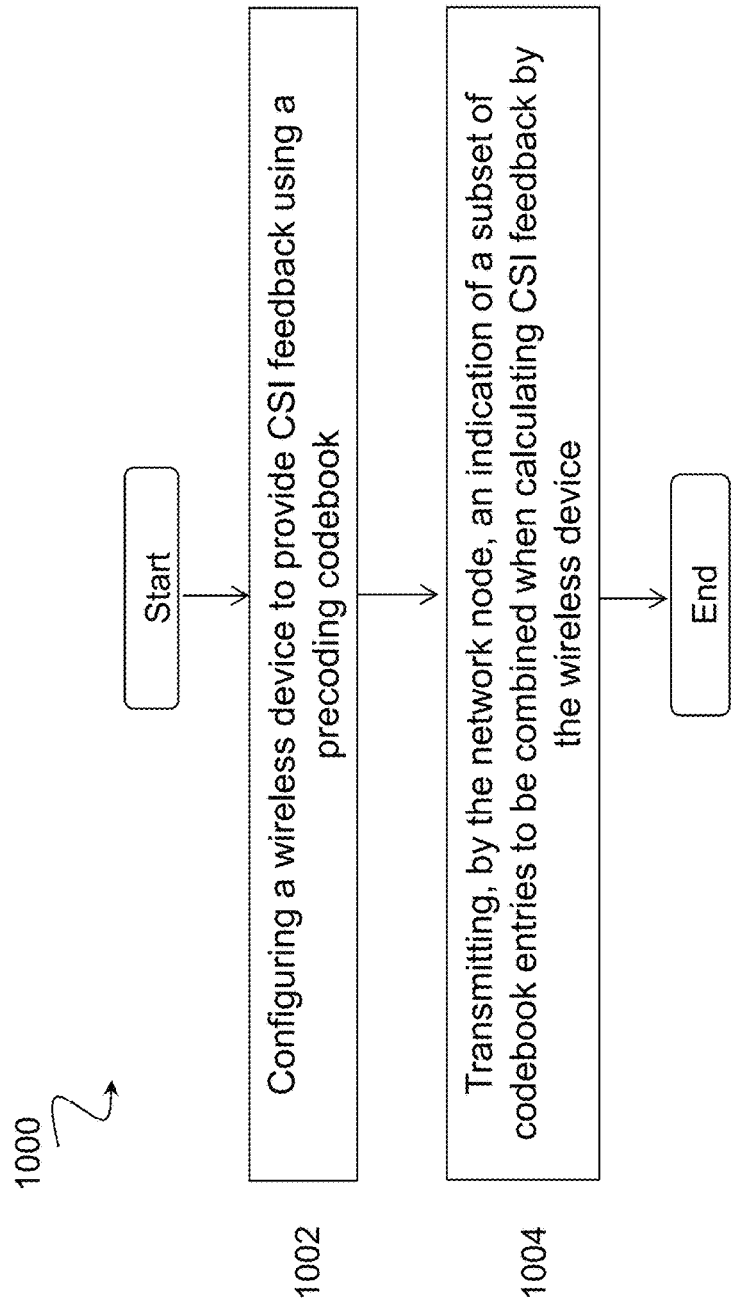
FIG. 10 illustrates an example method by a network node for adapting a codebook for use with multiple antenna configurations, according to certain embodiments.

FIG. 10 is a flow chart 1000 illustrating an example method by a network node 115 for adapting a codebook for use with multiple antenna configurations, according to certain embodiments. The method begins at step 1002 when a wireless device 110 is configured to provide CSI feedback using a precoding codebook. Each one of a plurality of codebook entries within the precoding codebook may correspond to a potential position of an antenna element.

At step 1004, an indication of a subset of codebook entries to be combined when calculating CSI feedback is transmitted by network node 115 to wireless device 110. In certain embodiments, the codebook entries within the precoding codebook may be associated with at least one uniformly spaced linear array of potential antenna positions. In certain embodiments, the uniformly spaced linear array may include a first number of antenna elements that is a power of 2. Conversely, the subset of codebook entries may identify a second number of antenna elements that is less than the first number of antenna elements. A combination of the potential antenna positions associated with the second number of antenna elements in the subset of codebook entries may, in a particular embodiment, form a non-linear array.

In certain embodiments, the indication of the subset of codebook entries to be combined may include a bitmap. Each bit in the bitmap indicates a codebook entry to be combined when calculating the CSI feedback.

Optionally, the method may further include transmitting signals from a subset of antenna element positions corresponding to the subset of codebook entries identified by the indication. In a particular embodiment, the signals may include reference signals. Each antenna port number may be associated with an element of the subset of codebook entries.

Optionally, an indication of a second subset of codebook entries may be signalled to wireless device 110. The second subset of codebook entries may correspond to one or more beam directions. The second subset may identify codebook entries that may not be used by the wireless device when calculating CSI feedback.

Figure 11:
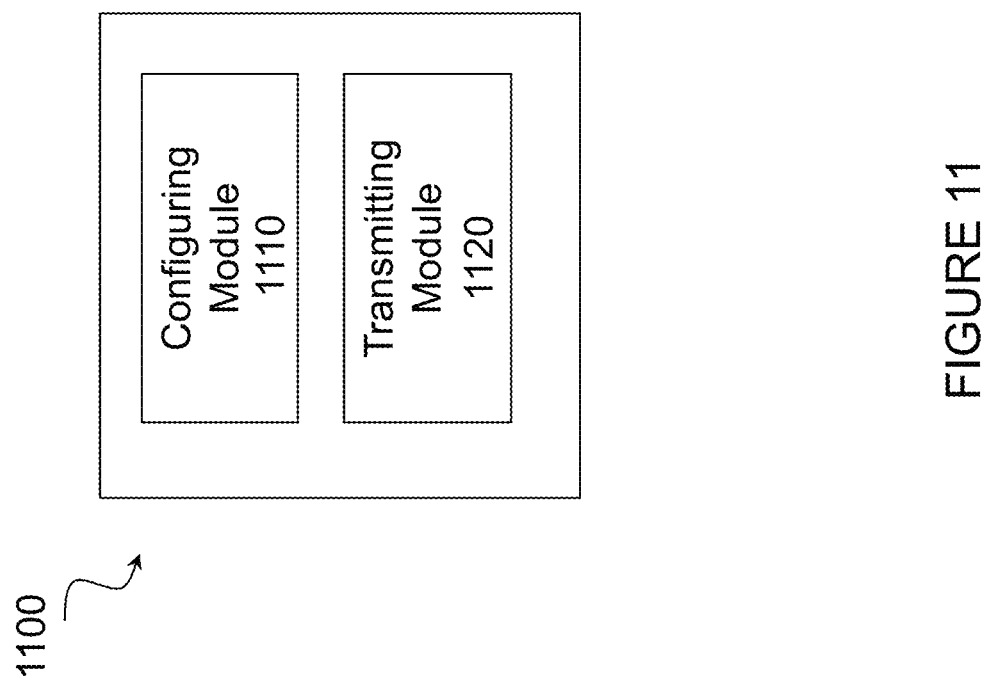
FIG. 11 illustrates an example computer networking virtual apparatus for adapting a codebook for use with multiple antenna configurations, according to certain embodiments.

In certain embodiments, the method for adapting a codebook for use with multiple antenna configurations as described above may be performed by a computer networking virtual apparatus. FIG. 11 illustrates an example computer networking virtual apparatus 1100 for adapting a codebook for use with multiple antenna configurations, according to certain embodiments. In certain embodiments, virtual computing device 1100 may include modules for performing steps similar to those described above with regard to the method illustrated and described in FIG. 10. For example, computer networking virtual apparatus 1100 may include at least one configuring module 1110, a transmitting module 1120, and any other suitable modules for adapting a codebook for use with multiple antenna configurations. In some embodiments, one or more of the modules may be implemented using one or more processors 420 of FIG. 4. In certain embodiments, the functions of two or more of the various modules may be combined into a single module.

The configuring module 1110 may perform the configuring functions of computer networking virtual apparatus 1100. For example, in a particular embodiment, configuring module 1110 may configure wireless device 110 to provide CSI feedback using a precoding codebook. Each one of a plurality of codebook entries within the precoding codebook may correspond to a potential position of an antenna element.

The transmitting module 1120 may perform the transmitting functions of computer networking virtual apparatus 1100. For example, in a particular embodiment, transmitting module 1120 may transmit an indication of a subset of codebook entries to be combined when calculating CSI feedback by wireless device 110. The indication may be transmitted to wireless device 110. In certain embodiments, the codebook entries within the precoding codebook may be associated with at least one uniformly spaced linear array of potential antenna positions. In certain embodiments, the uniformly spaced linear array may include a first number of antenna elements that is a power of 2. Conversely, the subset of codebook entries may identify a second number of antenna elements that is less than the first number of antenna elements. A combination of the potential antenna positions associated with the second number of antenna elements in the subset of codebook entries may, in a particular embodiment, form a non-linear array. In certain embodiments, the indication of the subset of codebook entries to be combined may include a bitmap. Each bit in the bitmap indicates a codebook entry to be combined when calculating the CSI feedback.

Other embodiments of computer networking virtual apparatus 1100 may include additional components beyond those shown in FIG. 11 that may be responsible for providing certain aspects of the network node's 115 functionality, including any of the functionality described above and/or any additional functionality (including any functionality necessary to support the solutions described above). The various different types of wireless devices 115 may include components having the same physical hardware but configured (e.g., via programming) to support different radio access technologies, or may represent partly or entirely different physical components.

Figure 12:
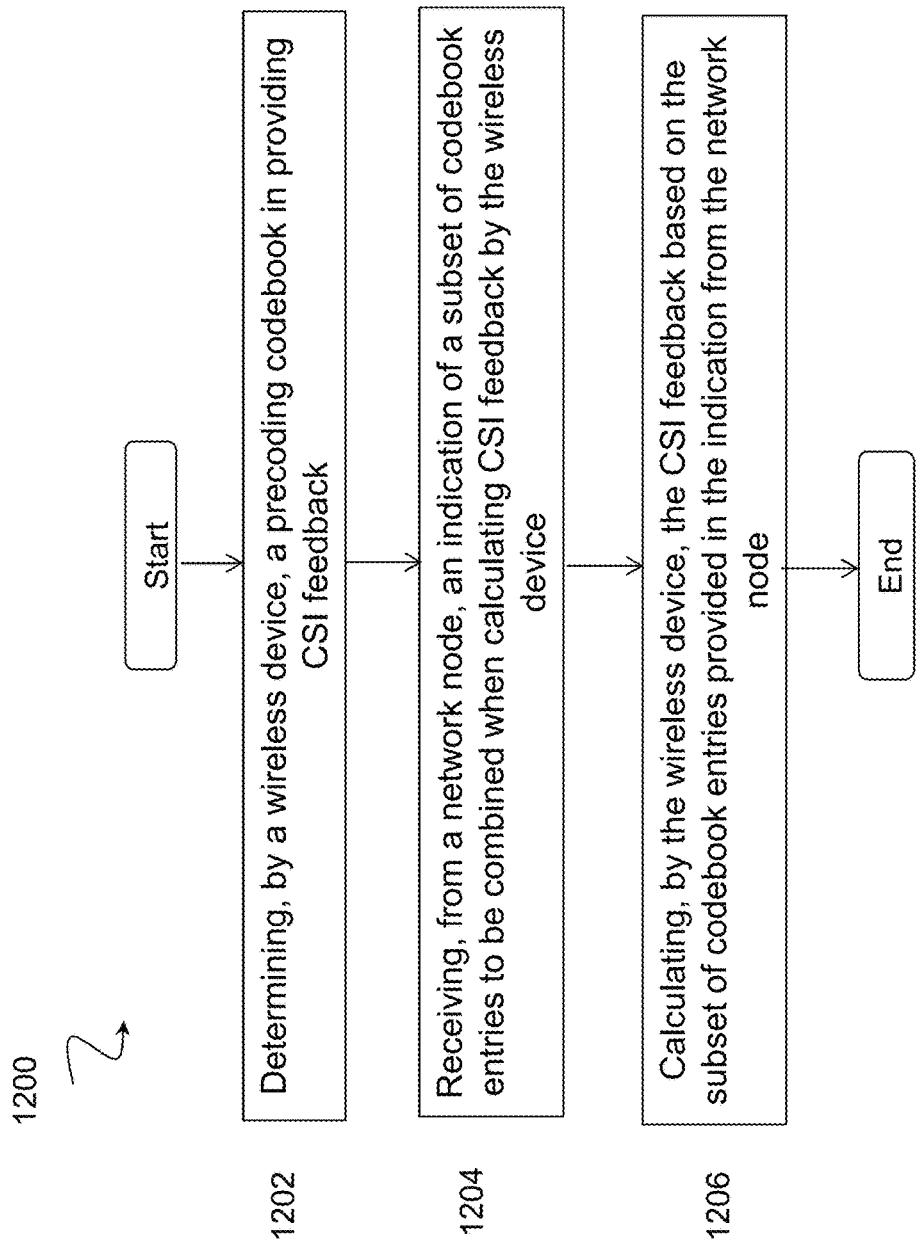
FIG. 12 illustrates an exemplary method by a wireless device for adapting a codebook for use with multiple antenna configurations, according to certain embodiments.

FIG. 12 is a flowchart 1200 illustrating an exemplary method by a wireless device for adapting a codebook for use with multiple antenna configurations, according to certain embodiments. The method begins at step 1202 when wireless device 110 determines a precoding codebook in providing CSI feedback. Each one of a plurality of codebook entries within the precoding codebook may correspond to a potential position of an antenna element.

At step 1204, wireless device 110 receives, from a network node, an indication of a subset of codebook entries to be combined when calculating CSI feedback by wireless device 110. In certain embodiments, the codebook entries within the precoding codebook may be associated with at least one uniformly spaced linear array of potential antenna positions. The uniformly spaced linear array includes a first number of antenna elements that is a power of two, in particular embodiments. Conversely, the subset of codebook entries may identify a second number of antenna elements that is less than the first number of antenna elements. In particular embodiments, a combination of the potential antenna positions associated with the second number of antenna elements in the subset of codebook entries form a non-linear array.

In certain embodiments, the indication of the subset of codebook entries may include at least one list of integer indices. Each index in the list of integer indices may be less than the threshold number of antenna elements. In certain other embodiments, the indication of the subset of codebook entries to be combined may include a bitmap. Each bit in the bitmap may indicate a codebook entry to be combined when calculating the CSI feedback.

At step 1206, wireless device 110 calculates the CSI feedback based on the subset of codebook entries provided in the indication from the network node. In particular embodiments, wireless device 110 may calculate the CSI feedback using all entries of the precoding codebook when a number of occupied antenna elements is above a threshold number of antenna elements. Conversely, wireless device 110 may be configured to calculate the CSI feedback using the subset of codebook entries when the number of occupied antenna elements is below the threshold number of antenna elements.

Figure 13:
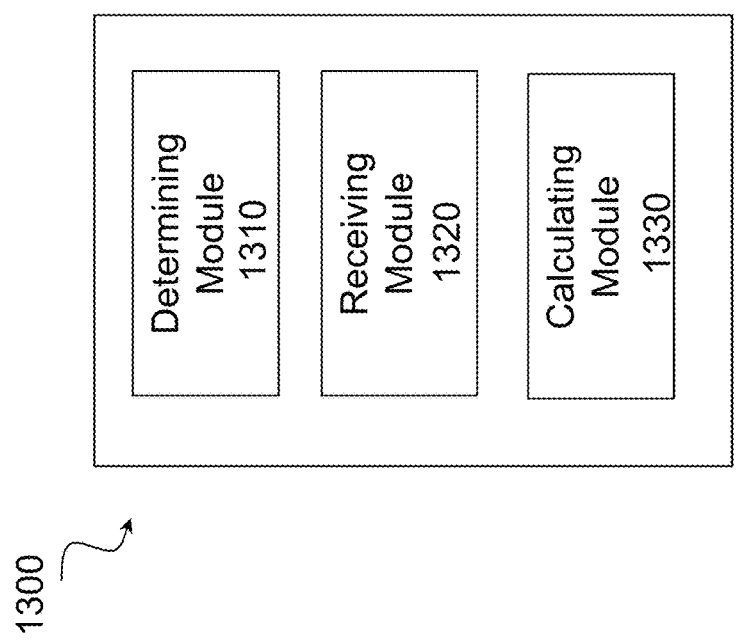
FIG. 13 illustrates an exemplary computer networking virtual apparatus for adapting a codebook for use with multiple antenna configurations, according to certain embodiments.

In certain embodiments, the method for adapting a codebook for use with multiple antenna configurations as described above may be performed by a computer networking virtual apparatus. FIG. 13 illustrates an example computer networking virtual apparatus 1300 for adapting a codebook for use with multiple antenna configurations, according to certain embodiments. In certain embodiments, virtual computing device 1300 may include modules for performing steps similar to those described above with regard to the method illustrated and described in FIG. 12. For example, computer networking virtual apparatus 1300 may include at least one determining module 1310, a receiving module 1320, a calculating module 1330, and any other suitable modules for adapting a codebook for use with multiple antenna configurations. In some embodiments, one or more of the modules may be implemented using one or more processors 520 of FIG. 5. In certain embodiments, the functions of two or more of the various modules may be combined into a single module.

The determining module 1310 may perform the determining functions of computer networking virtual apparatus 1300. For example, in a particular embodiment, determining module 1310 may determine a precoding codebook in providing CSI feedback. Each one of a plurality of codebook entries within the precoding codebook may correspond to a potential position of an antenna element.

The receiving module 1320 may perform the receiving functions of computer networking virtual apparatus 1300. For example, in a particular embodiment, receiving module 1320 may receive an indication of a subset of codebook entries from network node 115. In certain embodiments, receiving module 1320 may receive at least one list of integer indices. Each index in the list of integer indices may be less than the threshold number of antenna elements. In certain other embodiments, receiving module 1320 may receive a bitmap. Each bit in the bitmap may indicate a codebook entry to be combined when calculating the CSI feedback.

The calculating module 1330 may perform the calculating functions of computer networking virtual apparatus 1300. For example, in a particular embodiment, calculating module 1330 may calculate the CSI feedback based on the subset of codebook entries provided in the indication from the network node. In particular embodiments, calculating module 1330 may calculate the CSI feedback using all entries of the precoding codebook when a number of occupied antenna elements is above a threshold number of antenna elements. Calculating module 1330 may also be configured to calculate the CSI feedback using the subset of codebook entries when the number of occupied antenna elements is below the threshold number of antenna elements.

Other embodiments of computer networking virtual apparatus 1300 may include additional components beyond those shown in FIG. 13 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Certain embodiments provide antenna port mapping for variably-sized arrays. Previous techniques for providing CSI feedback use fixed one-to-one antenna port-to-antenna position mappings, with a unique mapping for each number of configured CSI-RS ports. However, where multiple distinct sets of antenna positions are allowed for a given number of configured CSI-RS ports, it may be necessary to determine a CSI-RS port-to-antenna position mapping.

In a particular embodiment, the CSI-RS port indices may be incremented by 1 for each occupied element position in £. Then the CSI-RS port number corresponding to horizontal and vertical element position index pair (l, m) may be determined for the +45° and −45° polarizations using the following equations, respectively:

$$p^{+45}(l, m) = \sum_{j=0}^{m} \sum_{i=0}^{l} \delta((i, j) \in \mathcal{L})$$

$$p^{-45}(l, m) = p^{+45}(l, m) + \sum_{j=0}^{M_{max0}} \sum_{i=0}^{L_{max0}} \delta((i, j) \in \mathcal{L})$$

where, $$\delta((i, j) \in \mathcal{L}) = \begin{cases} 1; & (i, j) \in \mathcal{L} \\ 0; & \text{Otherwise} \end{cases}$$

$M_{max0}$ and $L_{max0}$ are the maximum values of l and m for which an antenna element is occupied.

Figure 14:
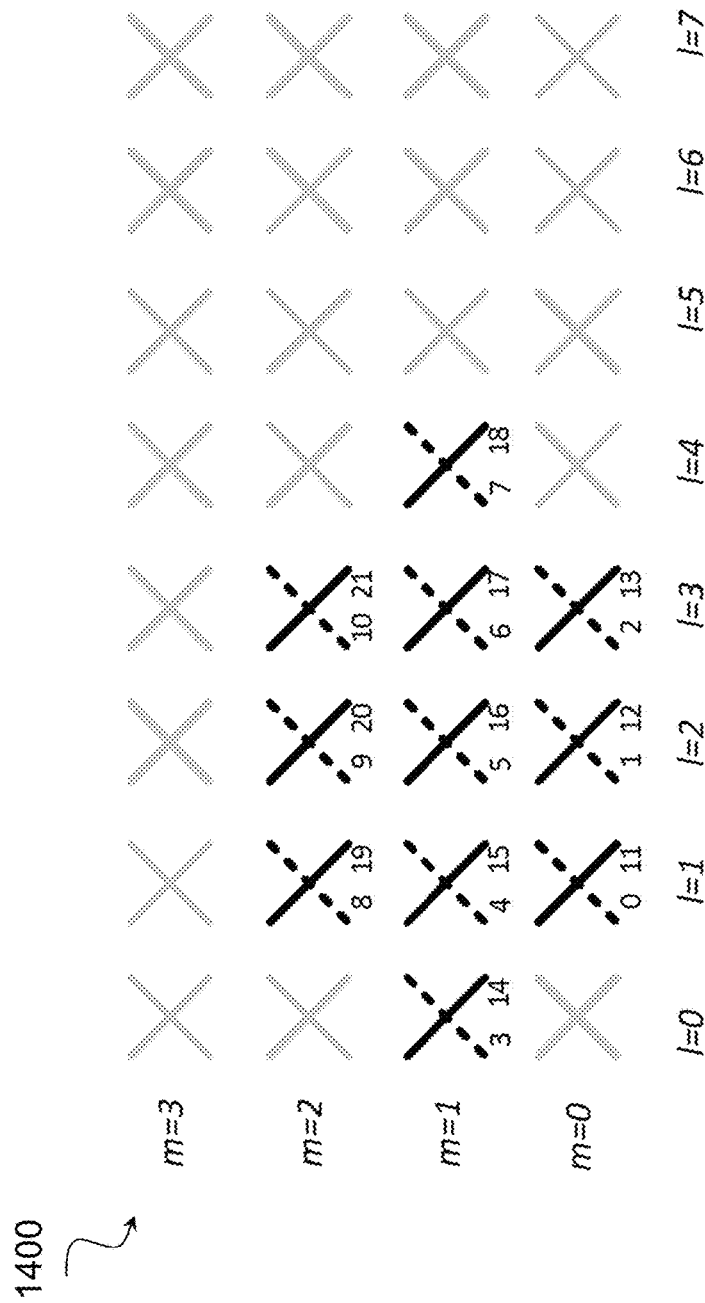
FIG. 14 illustrates an example configuration for antenna element position and antenna port numbering, according to certain embodiments.

FIG. 14 illustrates an example configuration 1400 for antenna element position and antenna port numbering, according to certain embodiments. As depicted, the antenna element positioning 1400 forms a substantially elliptical two-dimensional array of cross-polarized elements. According to a particular embodiment, antenna port numbering starts at the lower left hand side of a two-dimensional antenna array as viewed from the front of the array. Similar to above, the +45° and −45° polarizations are shown with black dashed and solid lines, respectively. Additionally, potential element positions are defined on a grid, gray positions are not occupied, and axes defining the antenna element positions (l, m) are shown. The port numbering increases first from left to right on the lower most row (i.e., first with increasing l). Port numbering then proceeds to the second row from left to right (i.e., next with increasing m), and so on. The port numbering starts at 0 with the +45° polarization at (l=1, m=0) continuing to the last +45° port, port 10 at (l=3, m=2). Then port numbering starts on the −45° ports with port 11 at (l=1, m=0). Port numbering finishes on the last antenna port, port 21, at (l=3, m=2). $M_{max}$ may be equal to two and $L_{max}$ may be equal to four, as show in the example embodiment depicted in FIG. 14.

The CSI-RS port number calculation can be represented in a variety of other ways, according to particular embodiments. For example, in one alternative embodiment, the list of occupied antenna elements, £, may be represented using a bitmapped matrix, L, as described above, where each element of L corresponds to an antenna element position and is a '1' if the position is occupied by an antenna element or a '0' if the position is unoccupied. Therefore, in a particular embodiment, the CSI-RS port number corresponding to horizontal and vertical element position index pair (l, m) may be determined as follows:

$$p(l, m)^{+45} = \sum_{j=0}^{m} \sum_{i=0}^{l} L(i, j)$$

$$p(l, m)^{-45} = p(l, m)^{+45} + \sum_{j=0}^{M_{max}-1} \sum_{i=0}^{L_{max}-1} L(i, j)$$

where

L (i, j) is the element in row i and column j of L; and $M_{max}$ and $L_{max}$ are the maximum supported numbers of rows and columns of a two-dimensional antenna array, respectively.

$M_{max}$ may be equal to three and $L_{max}$ may be equal to seven in the example embodiment depicted in FIG. 14.

Similar embodiments can be used for single polarized arrays. In such a case, the cross-polarized elements above are replaced with a single polarized element carrying one antenna port. The antenna port number for each single polarized element is then calculated using the same method as for the +45° degree port. The following equation may be used when the occupied elements are indicated with a list, £:

$$p(l, m) = \sum_{j=0}^{m} \sum_{i=0}^{l} \delta((i, j) \in \mathcal{L})$$

Conversely, the following equation may be used when the occupied elements are indicated with bitmapped matrix, L:

$$p(l, m) = \sum_{j=0}^{m} \sum_{i=0}^{l} L(i, j)$$

It also may be possible to have a fixed antenna port-to-antenna position mapping, where each potential antenna element position of the largest array supported by the specification is given an antenna port number. In this case, the bitmapped matrix, L, may be used, where each element of L additionally represents an antenna port. When an element of L is '1', then the antenna element position is occupied, and the codebook entry and measurements of the antenna port may be used for CSI feedback. Conversely, when an element of L is '0', then the antenna element position is unoccupied, and the codebook entry and measurements of the antenna port should not be used for CSI feedback.

According to certain embodiments, methods and systems for recovering performance loss resulting from variable array sizes are provided. Specifically, there are $N_0$ and $N_1$ different nominal beam directions for the horizontal and vertical directions, respectively. Although the beam directions don't vary with the number of actually occupied antenna element locations, the beams become wider as fewer elements are occupied. As a result, the positions of nulls and sidelobes vary with the number of occupied antenna elements. Getting the best performance from vertically beam-formed two-dimensional antenna arrays can require careful placement of nulls and sidelobes. As such, if the number of occupied elements varies, nulls or sidelobes can shift from optimized locations, degrading performance.

Figure 15:
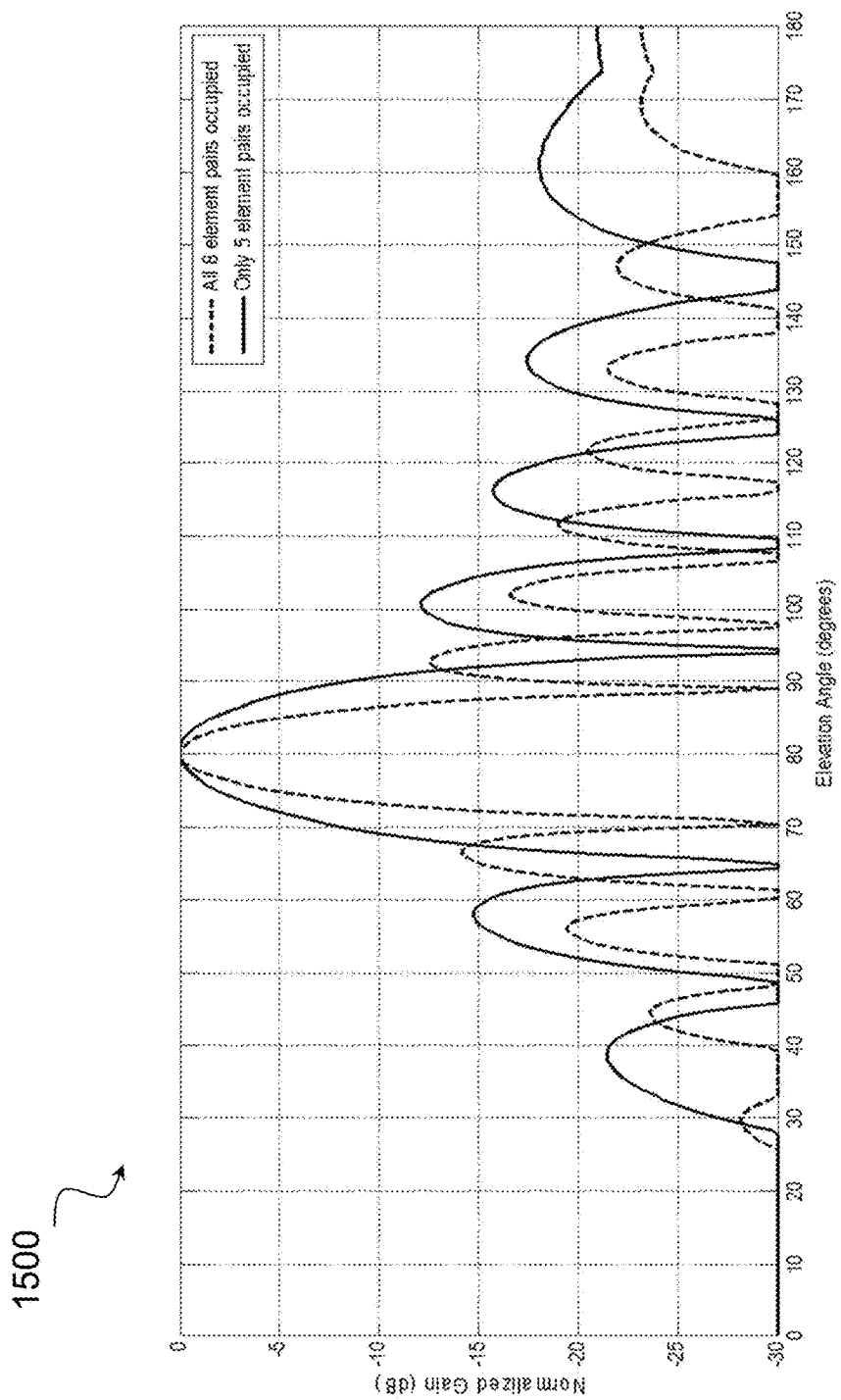
FIG. 15 illustrates sidelobe and null shifting that may arise from varying a number of occupied antenna elements, according to certain embodiments.

FIG. 15 is a graph 1500 depicting the effect of sidelobe and/or null shifting resulting from varying the number of occupied antenna elements, according to certain embodiments. As depicted, one beam is drawn from a codebook designed for an 8×1 cross-polarized antenna array with all elements occupied. Also shown in FIG. 15 is the corresponding beam that results from having only 5 cross-polarized element pairs occupied. As shown, the beam with five occupied elements has significantly more gain toward the horizon (i.e., towards an elevation angle of 90 degrees), which can increase interference to neighboring cells.

A solution to loss of performance from fewer occupied elements is to restrict the precoders that are used to transmit upon. Sometimes the precoders are referred to as beams, and this type of restriction may be referred to as codebook subset restriction. In this case, a list, R, of vertical and/or horizontal beam indices that wireless device 110 may not use in calculating CSI feedback is provided to wireless device 110. All codebook entries (identified by horizontal and vertical beam pairs ($k_H$, $k_V$)) that are in the restricted list, R, may not be selected precoders in the CSI feedback from wireless device 110. By restricting wireless device 110 from selecting these undesirable beams that would transmit energy in the direction of the optimized nulls or sidelobes, network node 115 has accurate CSI feedback for the best of the beams, and performance may be substantially improved.

Figure 16:
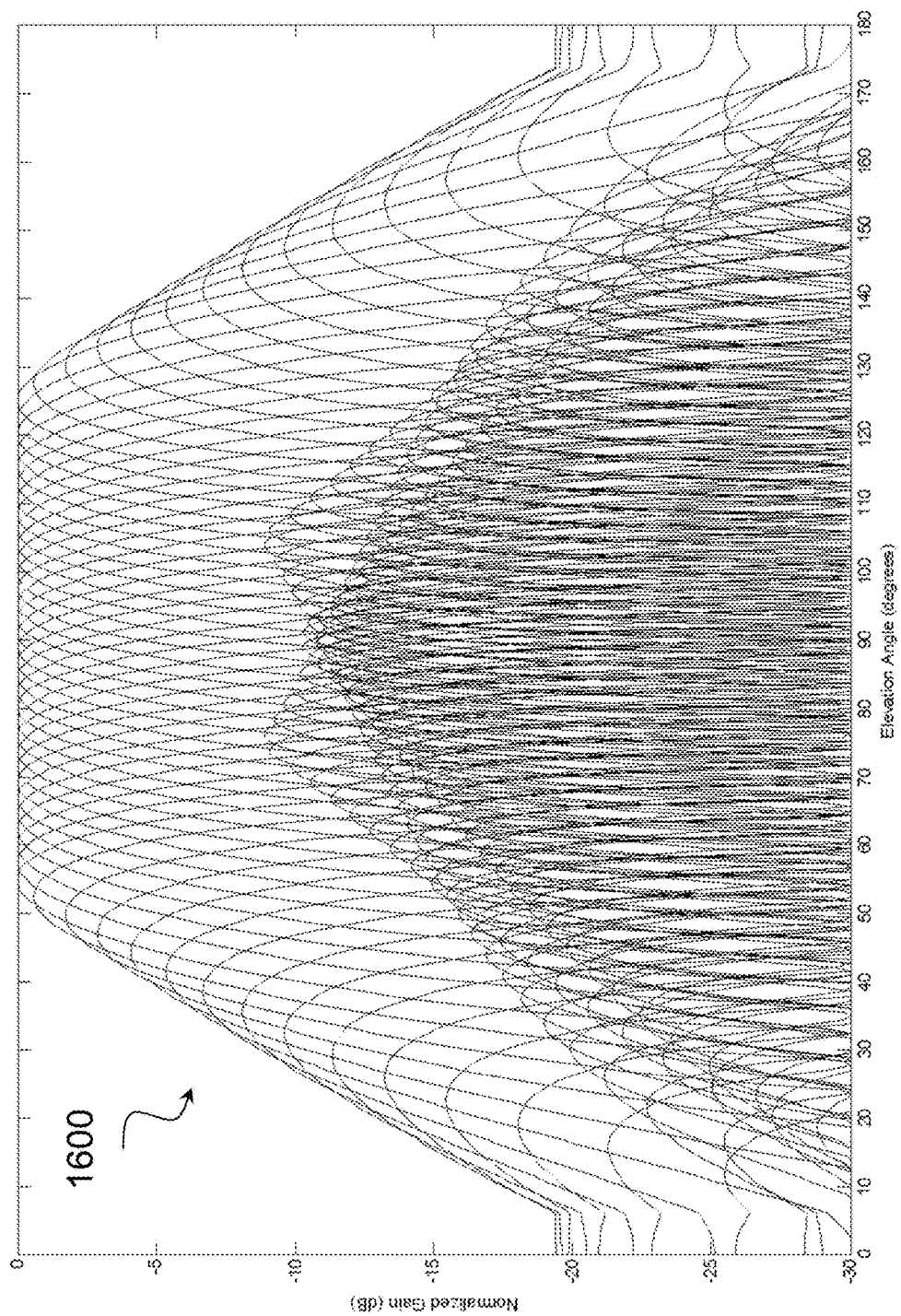
FIG. 16 illustrates beams in codebook without codebook subset restriction, according to certain embodiments.
Figure 17:
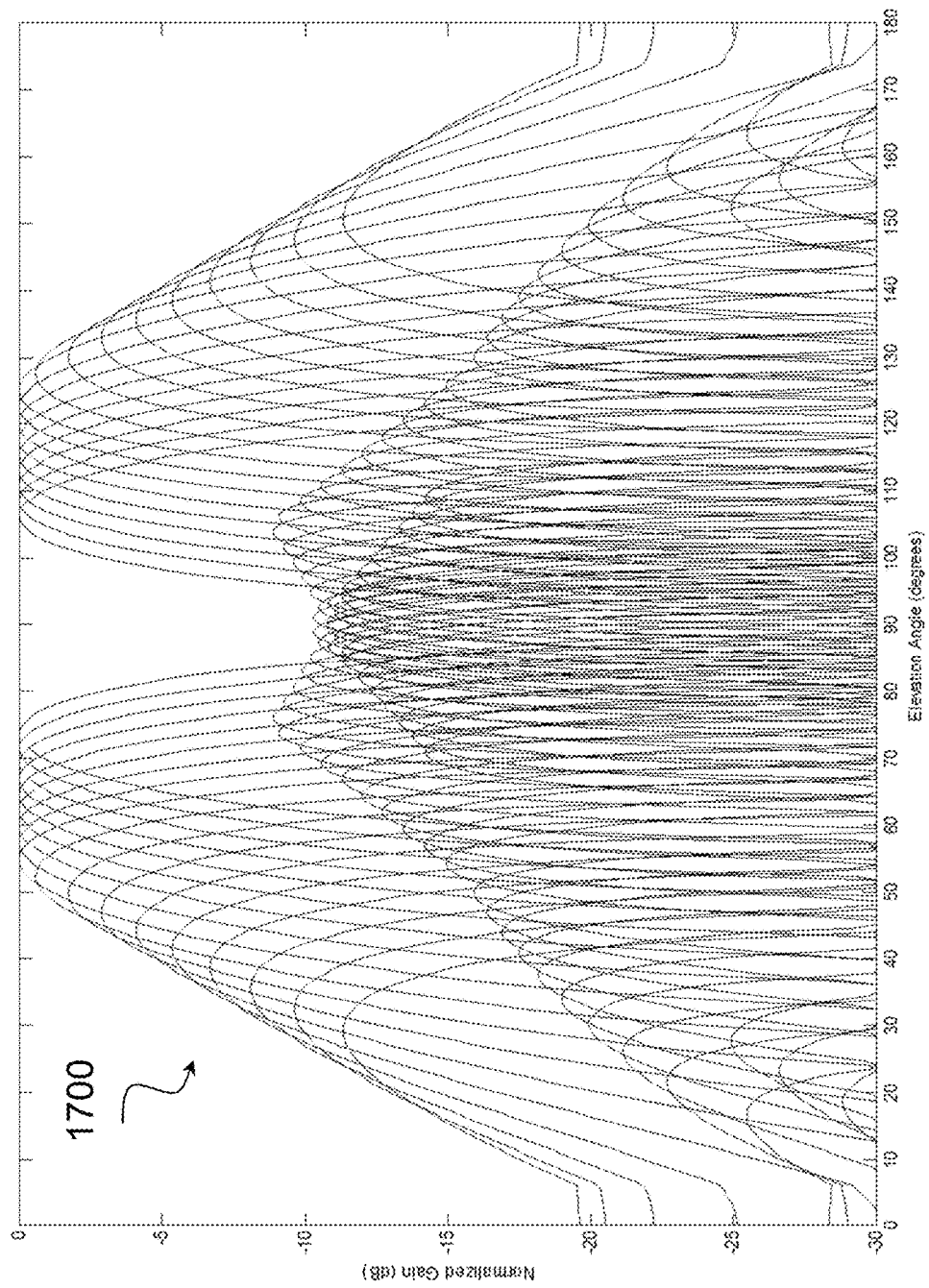
FIG. 17 illustrates beams in codebook after codebook subset restriction to remove undesirable beams in a given direction, according to certain embodiments.

The effects of codebook restriction are illustrated in FIGS. 16 and 17. Specifically, FIG. 16 is a graph 1600 depicting beams in codebook without codebook subset restriction, according to certain embodiments. The example depicts the unrestricted beam patterns for the case where the codebook is designed for an 8×1 cross-polarized antenna array and only five cross polarized element pairs are occupied. In this example, the beams that point towards the horizon may be removed via codebook subset restriction. FIG. 17 is a graph 100 depicting beams in the codebook after codebook restriction to remove the undesirable beams, according to certain embodiments. As a result, the additional interference towards the horizon that resulted from using fewer occupied elements (i.e., five in the depicted example) can be reduced.

Because the best performing codebook restricted subset may vary with the number of occupied antenna elements, in certain embodiments, a first list, $R_1$, of vertical and/or horizontal beam indices that wireless device 110 may not use in calculating CSI feedback is indicated to wireless device 110 when a first list, $\mathcal{L}_1$, of indices of occupied antenna element locations is indicated to wireless device 110. Similarly, and a second list, $R_2$, of vertical and/or horizontal beam indices that wireless device 110 may not use in calculating CSI feedback is indicated to wireless device 110 when a second list, $\mathcal{L}_2$, of indices of occupied antenna element locations is indicated to wireless device 110.

In an alternative embodiment, sub-array virtualization (i.e., virtualizing adjacent antenna elements) in vertical and/or horizontal directions can be used to place nulls in the desired optimized locations. Due to the placement of the null in a desired direction, the shifting of null/sidelobe positions that result from varying the number of actually occupied does not increase the interference in the desired direction. Hence, certain embodiments improve performance without codebook subset restriction.

Figure 18:
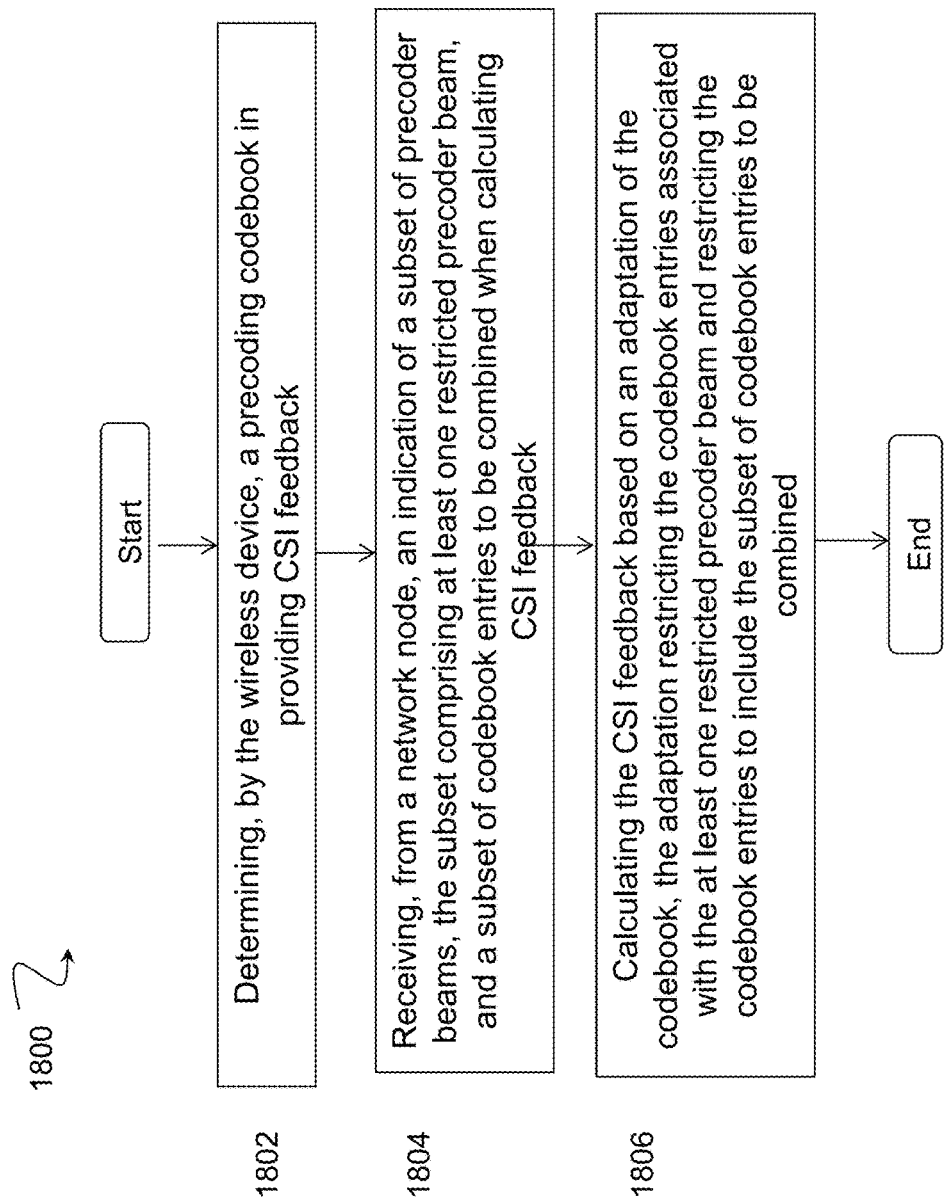
FIG. 18 illustrates an exemplary method by a wireless device for adapting a codebook for use with multiple antenna configurations and for removing undesirable beams in a given direction, according to certain embodiments.

FIG. 18 is a flowchart 1800 illustrating an exemplary method by a wireless device 110 for adapting a codebook for use with multiple antenna configurations and for removing undesirable beams in a given direction, according to certain embodiments. The method begins at step 1802 when wireless device 110 determines a precoding codebook in providing CSI feedback. Each one of a plurality of codebook entries within the precoding codebook may correspond to a potential position of an antenna element.

At step 1804, wireless device 110 receives an indication from a network node 115. According to certain embodiments, the indication includes a subset of precoder beams. The subset of precoder beams may include at least one restricted precoder beam to be restricted from a calculation of CSI feedback by the wireless device. The indication also includes a subset of codebook entries to be combined when calculating CSI feedback by wireless device 110. In certain embodiments, the codebook entries within the precoding codebook may be associated with at least one uniformly spaced linear array of potential antenna positions. The uniformly spaced linear array includes a first number of antenna elements that is a power of two, in particular embodiments. Conversely, the subset of codebook entries may identify a second number of antenna elements that is less than the first number of antenna elements. In particular embodiments, a combination of the potential antenna positions associated with the second number of antenna elements in the subset of codebook entries form a non-linear array.

In certain embodiments, the indication of the subset of codebook entries may include at least one list of integer indices. Each index in the list of integer indices may be less than the threshold number of antenna elements. In certain other embodiments, the indication of the subset of codebook entries to be combined may include a bitmap. Each bit in the bitmap may indicate a codebook entry to be combined when calculating the CSI feedback.

At step 1806, wireless device 110 calculates the CSI feedback based an adaptation of the codebook. According to certain embodiments, the adaptation of the codebook restricts the codebook entries associated with the at least one restricted precoder beam. The adaptation also restricts the codebook entries to include only the subset of codebook entries to be combined as identified in the indication from the network node 115.

Figure 19:
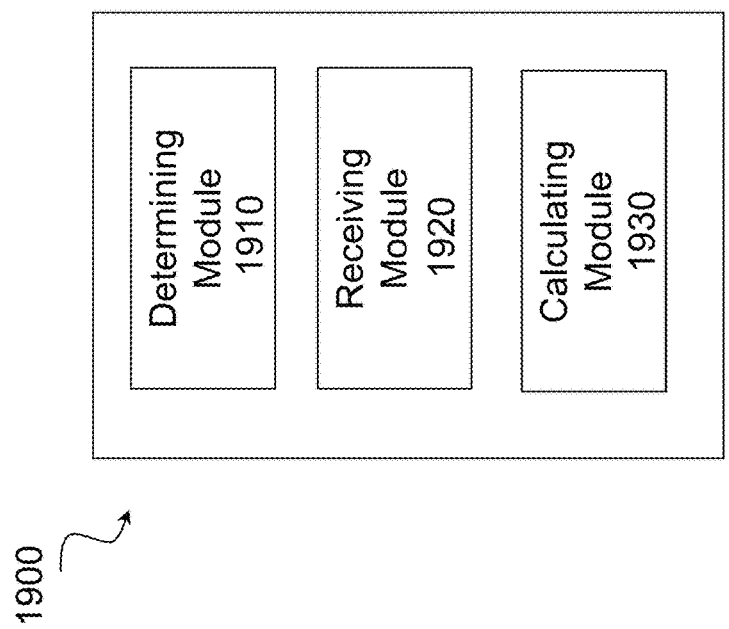
FIG. 19 illustrates an exemplary computer networking virtual apparatus for adapting a codebook for use with multiple antenna configurations and for removing undesirable beams in a given direction, according to certain embodiments.

In certain embodiments, the method for adapting a codebook for use with multiple antenna configurations as described above may be performed by a computer networking virtual apparatus. FIG. 19 illustrates an example computer networking virtual apparatus 1900 for adapting a codebook for use with multiple antenna configurations and for removing undesirable beams in a given direction, according to certain embodiments. In certain embodiments, virtual computing device 1900 may include modules for performing steps similar to those described above with regard to the method illustrated and described in FIG. 18. For example, computer networking virtual apparatus 1900 may include at least one determining module 1910, a receiving module 1920, a calculating module 1930, and any other suitable modules for adapting a codebook for use with multiple antenna configurations and for removing undesirable beams in a given direction. In some embodiments, one or more of the modules may be implemented using one or more processors 520 of FIG. 5. In certain embodiments, the functions of two or more of the various modules may be combined into a single module.

The determining module 1910 may perform the determining functions of computer networking virtual apparatus 1900. For example, in a particular embodiment, determining module 1910 may determine a precoding codebook in providing CSI feedback. Each one of a plurality of codebook entries within the precoding codebook may correspond to a potential position of an antenna element.

The receiving module 1920 may perform the receiving functions of computer networking virtual apparatus 1900. For example, in a particular embodiment, receiving module 1920 may receive an indication from network node 115. According to certain embodiments, the indication includes a subset of precoder beams. The subset of precoder beams may include at least one restricted precoder beam to be restricted from a calculation of CSI feedback by the wireless device.

The indication may also include a subset of codebook entries to be combined when calculating CSI feedback by wireless device 110. In certain embodiments, the codebook entries within the precoding codebook may be associated with at least one uniformly spaced linear array of potential antenna positions. The uniformly spaced linear array includes a first number of antenna elements that is a power of two, in particular embodiments. Conversely, the subset of codebook entries may identify a second number of antenna elements that is less than the first number of antenna elements. In particular embodiments, a combination of the potential antenna positions associated with the second number of antenna elements in the subset of codebook entries form a non-linear array.

In certain embodiments, the indication of the subset of codebook entries may include at least one list of integer indices. Each index in the list of integer indices may be less than the threshold number of antenna elements. In certain other embodiments, the indication of the subset of codebook entries to be combined may include a bitmap. Each bit in the bitmap may indicate a codebook entry to be combined when calculating the CSI feedback.

The calculating module 1930 may perform the calculating functions of computer networking virtual apparatus 1900. For example, in a particular embodiment, calculating module 1930 may calculate the CSI feedback based an adaptation of the codebook. According to certain embodiments, the adaptation of the codebook restricts the codebook entries associated with the at least one restricted precoder beam. The adaptation also restricts the codebook entries to include only the subset of codebook entries to be combined as identified in the indication from the network node 115.

Other embodiments of computer networking virtual apparatus 1900 may include additional components beyond those shown in FIG. 19 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 20:
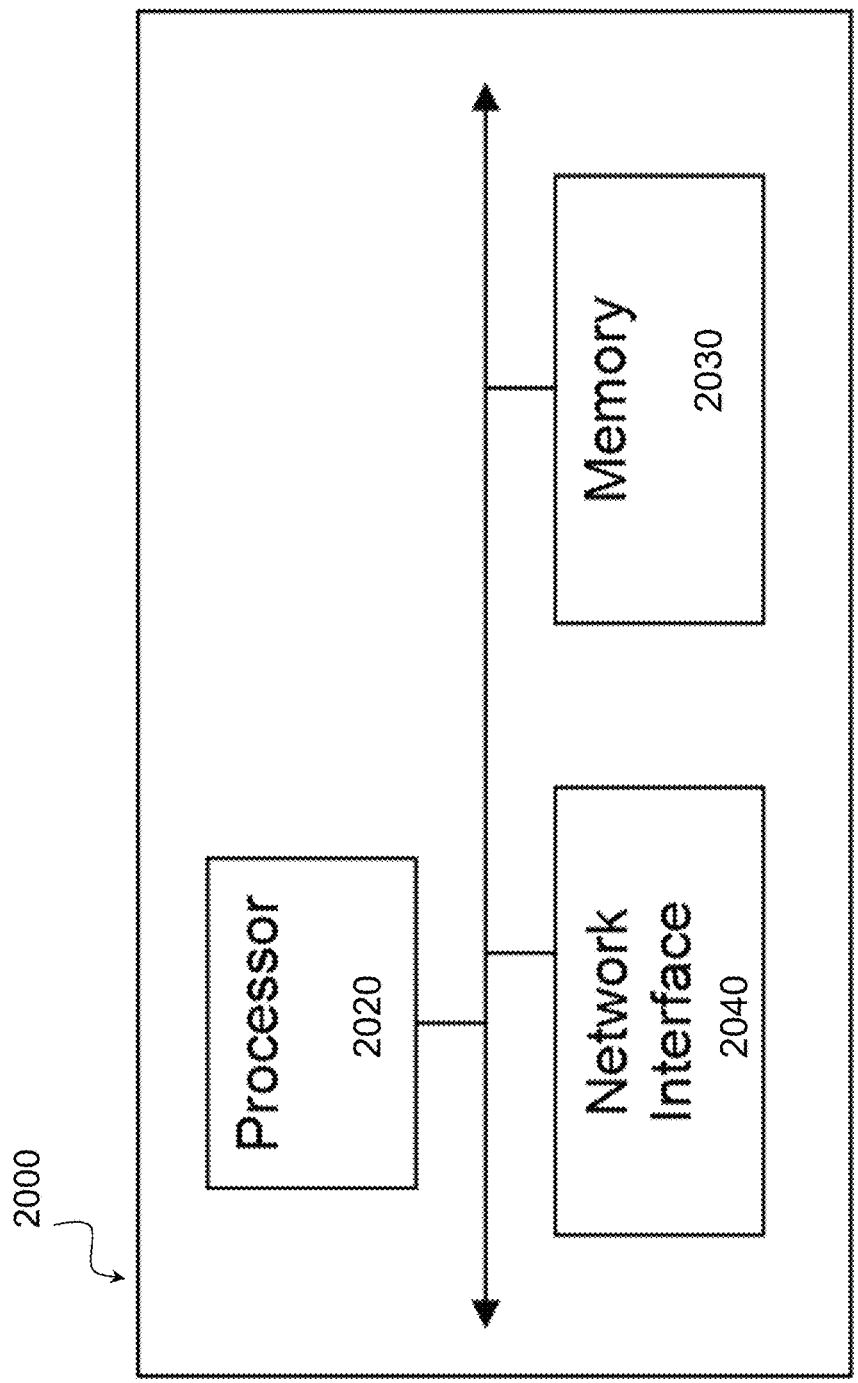
FIG. 20 illustrates an exemplary radio network controller or core network node, according to certain embodiments.

FIG. 20 illustrates an exemplary radio network controller or core network node, in accordance with certain embodiments. Examples of network nodes can include a mobile switching center (MSC), a serving GPRS support node (SGSN), a mobility management entity (MME), a radio network controller (RNC) (such as RNC 120 depicted in FIG. 1), a core network node (such as core network node 130 depicted in FIG. 1), a base station controller (BSC), and so on. The radio network controller or core network node 2000 includes processor 2020, memory 2030, and network interface 2040. In some embodiments, processor 2020 executes instructions to provide some or all of the functionality described above as being provided by the network node, memory 2030 stores the instructions executed by processor 2020, and network interface 840 communicates signals to any suitable node, such as a gateway, switch, router, Internet, Public Switched Telephone Network (PSTN), network nodes 115, radio network controllers or core network nodes 2000, etc.

Processor 2020 may include any suitable combination of hardware and software implemented in one or more modules to execute instructions and manipulate data to perform some or all of the described functions of the radio network controller or core network node 2000. In some embodiments, processor 2020 may include, for example, one or more computers, one or more central processing units (CPUs), one or more microprocessors, one or more applications, and/or other logic.

Memory 2030 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 2040 is communicatively coupled to processor 2020 and may refer to any suitable device operable to receive input for the network node, send output from the network node, perform suitable processing of the input or output or both, communicate to other devices, or any combination of the preceding. Network interface 2040 may include appropriate hardware (e.g., port, modem, network interface card, etc.) and software, including protocol conversion and data processing capabilities, to communicate through a network.

Other embodiments of the network node may include additional components beyond those shown in FIG. 20 that may be responsible for providing certain aspects of the network node's functionality, including any of the functionality described above and/or any additional functionality (including any functionality necessary to support the solution described above).

According to certain embodiments, a method by a network node for adapting a codebook for use with multiple antenna configurations is provided. The method includes configuring a wireless device to provide CSI feedback using a precoding codebook. Each one of a plurality of codebook entries within the precoding codebook correspond to a potential position of an antenna element. An indication of a subset of codebook entries is transmitted by the network node. The indication identifies a subset of codebook entries to be combined when calculating CSI feedback by the wireless device.

According to certain embodiments, a network node is provided. The network node includes a memory storing instructions for adapting a codebook for use with multiple antenna configurations and a processor. The processor is operable to execute the instructions to cause the processor to configure a wireless device to provide CSI feedback using a precoding codebook. Each one of a plurality of codebook entries within the precoding codebook corresponds to a potential position of an antenna element. The method further includes transmitting an indication of a subset of codebook entries to be combined when calculating CSI feedback by the wireless device.

According to certain embodiments, a method by a wireless device is provided for adapting a codebook for use with multiple antenna configurations. The method includes determining, by the wireless device, a precoding codebook in providing CSI feedback. Each one of a plurality of codebook entries within the precoding codebook corresponds to a potential position of an antenna element. An indication of a subset of codebook entries to be combined when calculating CSI feedback by the wireless device is received from a network node. The CSI feedback is calculated based on the subset of codebook entries provided in the indication from the network node.

According to certain embodiments, a wireless device is provided that includes a memory storing instructions for adapting a codebook for use with multiple antenna configurations. The wireless device further includes a processor operable to execute the instructions to cause the processor to use a precoding codebook in providing CSI feedback. Each one of a plurality of codebook entries within the precoding codebook corresponds to a potential position of an antenna element. An indication of a subset of codebook entries to be combined when calculating CSI feedback by the wireless device is received from the network node. The CSI feedback is calculated based on the subset of codebook entries provided in the indication from the network node.

According to certain embodiments, a method by a wireless device is provided for adapting a codebook for use with multiple antenna configurations. The method includes determining, by the wireless device, a precoding codebook in providing CSI feedback. Each one of a plurality of codebook entries within the precoding codebook corresponds to one of a plurality of precoder beams and to a potential position of an antenna element. The one of the plurality of precoder beams corresponds to a beam direction. From a network node, the wireless device receives an indication of a subset of the plurality of precoder beams and an indication of a subset of codebook entries to be combined when calculating CSI feedback by the wireless device. The subset of precoder beams includes at least one restricted precoder beam to be restricted from a calculation of CSI feedback by the wireless device. The subset of codebook entries corresponds to potential positions of antenna elements. The wireless device calculates the CSI feedback based on an adaptation of the codebook. The adaptation of the codebook restricts the codebook entries associated with the at least one restricted precoder beam and restricts the codebook entries to include the subset of codebook entries to be combined.

Certain embodiments of the present disclosure may provide one or more technical advantages. For example, certain embodiments may enable the use of conventionally-sized Fast Fourier Transform (FFT) arrays of a power of two for any size rectangular arrays. Certain embodiments may also enable the user of conventionally-sized FFT arrays for use with non-rectangular arrays whose elements are constrained to fall on a grid. Another advantage may be that the computational complexity for two-dimensional codebook search may be reduced. Since realistic antenna arrays tend not to have numbers of horizontal or vertical elements that are integer powers of two, existing codebook configurations may be adapted to support antennas used in real deployments. Still another advantage may allow the use of a single codebook for a wide variety of realistic antenna array configurations. As a result, CSI feedback implementations used by a wireless device may be simplified.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method by a network node for adapting a codebook for use with multiple antenna configurations, the method comprising:
configuring a wireless device to provide channel state information (CSI) feedback using a precoding codebook, each one of a plurality of codebook entries within the precoding codebook corresponding to a potential position of an antenna element;
configuring the wireless device to calculate CSI feedback by:
if a number of occupied antenna elements is above a threshold, combining all of the plurality of codebook entries within the precoding codebook; or
if the number of occupied antenna elements is below the threshold, combining a subset of codebook entries that is less than all of the plurality of codebook entries;
transmitting, by the network node, an indication of the subset of codebook entries to be combined when calculating the CSI feedback by the wireless device and the number of occupied antenna elements; and
receiving, by the network node, the CSI feedback from the wireless device, the CSI feedback calculated by combining all of the plurality of codebook entries within the precoding codebook when the indication identified that the number of occupied antenna elements is above the threshold and combining the subset of codebook entries that is less than all of the plurality of codebook entries when the indication identified that the number of occupied antenna elements is below the threshold.

2. The method of claim 1, further comprising transmitting reference signals from a subset of antenna element positions corresponding to the subset of codebook entries identified by the indication, each element of the subset of codebook entries being associated with at least one antenna port number.

3. The method of claim 1, further comprising transmitting an indication of a second subset of codebook entries corresponding to one or more beam directions, the second subset identifying codebook entries that may not be used by the wireless device when calculating CSI feedback.

4. The method of claim 1, wherein:
the plurality of codebook entries within the precoding codebook are associated with at least one uniformly spaced linear array of potential antenna positions, the uniformly spaced linear array comprising a first number of antenna elements that is a power of 2, and
the subset of codebook entries identifies a second number of antenna elements that is less than the first number of antenna elements.

5. The method of claim 4, wherein a combination of the potential antenna positions associated with the second number of antenna elements in the subset of codebook entries form a non-linear array.

6. The method of claim 1, wherein transmitting the indication of the subset of codebook entries to be combined comprises a bitmap, each bit in the bitmap indicating a codebook entry to be combined when calculating the CSI feedback.

7. The method of claim 1, further comprising:
receiving, by the network node, the CSI feedback from the wireless device;
using, by the network node, the CSI feedback to determine precoding for an antenna array; and
virtualizing, by the network node, antenna elements of the antenna array, wherein virtualizing antenna elements comprises transmitting a linear mapping of a same signal corresponding to an antenna port on a plurality of antenna elements.

8. A network node comprising:
a memory storing instructions for adapting a codebook for use with multiple antenna configurations; and
a processor operable to execute the instructions to cause the processor to:
configure a wireless device to provide channel state information (CSI) feedback using a precoding codebook, each one of a plurality of codebook entries within the precoding codebook corresponding to a potential position of an antenna element;
configure the wireless device to calculate CSI feedback by:
if a number of occupied antenna elements is above a threshold, combining all of the plurality of codebook entries within the precoding codebook; or
if the number of occupied antenna elements is below the threshold, combining a subset of codebook entries that is less than all of the plurality of codebook entries;
transmit an indication of the subset of codebook entries to be combined when calculating the CSI feedback by the wireless device and the number of occupied antenna elements; and
receive the CSI feedback from the wireless device, the CSI feedback calculated by combining all of the plurality of codebook entries within the precoding codebook when the indication identified that the number of occupied antenna elements is above the threshold and combining the subset of codebook entries that is less than all of the plurality of codebook entries when the indication identified that the number of occupied antenna elements is below the threshold.

9. The network node of claim 8, wherein the processor is further operable execute the instructions to cause the processor to transmit reference signals from a subset of antenna element positions corresponding to the subset of codebook entries identified by the indication, each element of the subset of codebook entries being associated with at least one antenna port number.

10. The network node of claim 8, wherein the processor is further operable to transmit an indication of a second subset of codebook entries corresponding to one or more beam directions, the second subset identifying codebook entries that may not be used by the wireless device when calculating CSI feedback.

11. The network node of claim 8, wherein:
the plurality of codebook entries within the precoding codebook are associated with at least one uniformly spaced linear array of potential antenna positions, the uniformly spaced linear array comprising a first number of antenna elements that is a power of 2, and
the subset of codebook entries identifies a second number of antenna elements that is less than the first number of antenna elements.

12. The network node of claim 11, wherein a combination of the potential antenna positions associated with the second number of antenna elements in the subset of codebook entries form a non-linear array.

13. The network node of claim 8, wherein the indication of the subset of codebook entries to be combined comprises a bitmap, each bit in the bitmap indicating a codebook entry to be combined when calculating the CSI feedback.

14. A method by a wireless device for adapting a codebook for use with multiple antenna configurations, the method comprising:
determining, by a wireless device, a precoding codebook in providing channel state information (CSI) feedback, each one of a plurality of codebook entries within the precoding codebook corresponding to a potential position of an antenna element;
receiving, from a network node, an indication of a subset of codebook entries to be combined when calculating the CSI feedback by the wireless device and a number of occupied antenna elements;
calculating, by the wireless device, the CSI feedback based on the indication from the network node, wherein calculating the CSI feedback comprises:
combining all of the plurality of codebook entries within the precoding codebook to calculate the CSI feedback when the indication identified that the number of occupied antenna elements is above a threshold; and
combining the subset of codebook entries that is less than all of the plurality of codebook entries to calculate the CSI feedback when the indication identified that the number of occupied antenna elements is below the threshold; and
transmitting the CSI feedback to the network node.

15. The method of claim 14, wherein:
the plurality of codebook entries within the precoding codebook are associated with at least one uniformly spaced linear array of potential antenna positions, the uniformly spaced linear array comprising a first number of antenna elements that is a power of 2, and
the subset of codebook entries identifies a second number of antenna elements that is less than the first number of antenna elements.

16. The method of claim 15, wherein a combination of the potential antenna positions associated with the second number of antenna elements in the subset of codebook entries form a non-linear array.

17. The method of claim 14, wherein the indication of the subset of codebook entries comprises at least one list of integer indices, each index in the list of integer indices being less than the threshold number of antenna elements.

18. The method of claim 14, wherein the indication of the subset of codebook entries to be combined comprises a bitmap, each bit in the bitmap indicating a codebook entry to be combined when calculating the CSI feedback.

19. A wireless device comprising:
a memory storing instructions for adapting a codebook for use with multiple antenna configurations; and
a processor operable to execute the instructions to cause the processor to:
determine a precoding codebook in providing channel state information (CSI) feedback, each one of a plurality of codebook entries within the precoding codebook corresponding to a potential position of an antenna element;
receive, from a network node, an indication of a subset of codebook entries to be combined when calculating the CSI feedback by the wireless device and a number of occupied antenna elements;
calculate the CSI feedback based on the indication from the network node, wherein calculating the CSI feedback comprises:
combining all of the plurality of codebook entries within the precoding codebook to calculate the CSI feedback when the indication identified that the number of occupied antenna elements is above a threshold; and
combining the subset of codebook entries that is less than all of the plurality of codebook entries to calculate the CSI feedback when the indication identified that the number of occupied antenna elements is below the threshold; and
transmit the CSI feedback to the network node.

20. The wireless device of claim 19, wherein:
the plurality of codebook entries within the precoding codebook are associated with at least one uniformly spaced linear array of potential antenna positions, the uniformly spaced linear array comprising a first number of antenna elements that is a power of 2, and
the subset of codebook entries identifies a second number of antenna elements that is less than the first number of antenna elements.

21. The wireless device of claim 20, wherein a combination of the potential antenna positions associated with the second number of antenna elements in the subset of codebook entries form a non-linear array.

22. The wireless device of claim 19, wherein the indication of the subset of codebook entries comprises at least one list of integer indices, each index in the list of integer indices being less than the threshold number of antenna elements.

23. The wireless device of claim 19, wherein the indication of the subset of codebook entries to be combined comprises a bitmap, each bit in the bitmap indicating a codebook entry to be combined when calculating the CSI feedback.

24. A method by a wireless device for adapting a codebook for use with multiple antenna configurations, the method comprising:
determining, by the wireless device, a precoding codebook in providing channel state information (CSI) feedback, each one of a plurality of codebook entries within the precoding codebook corresponding to one of a plurality of precoder beams and to a potential position of an antenna element, the one of the plurality of precoder beams corresponding to a beam direction;
receiving, from a network node:
an indication of a subset of the plurality of precoder beams, the subset comprising at least one restricted precoder beam to be restricted from a calculation of CSI feedback by the wireless device, and
an indication of a subset of codebook entries to be combined when calculating the CSI feedback by the wireless device and a number of occupied antenna elements, the subset of codebook entries corresponding to potential occupied positions of antenna elements; and
calculating the CSI feedback based on an adaptation of the codebook, the adaptation of the codebook restricting the codebook entries associated with the at least one restricted precoder beam and restricting the codebook entries to include the subset of codebook entries to be combined, wherein calculating the CSI feedback comprises:
combining all of the plurality of codebook entries within the precoding codebook to calculate the CSI feedback when the indication identified that the number of occupied antenna elements is above a threshold; and combining the subset of codebook entries that is less than all of the plurality of codebook entries to calculate the CSI feedback when the indication identified that the number of occupied antenna elements is below the threshold; and transmitting the CSI feedback to the network node.

* * * * *